(12) United States Patent
Yadav et al.

(10) Patent No.: US 8,932,632 B2
(45) Date of Patent: Jan. 13, 2015

(54) ADHESIVES AND SEALANTS NANOTECHNOLOGY

(75) Inventors: Tapesh Yadav, Longmont, CO (US); Audrey Vecoven, Mead, CO (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1292 days.

(21) Appl. No.: 10/969,353

(22) Filed: Oct. 21, 2004

(65) Prior Publication Data

US 2006/0035087 A1   Feb. 16, 2006

Related U.S. Application Data

(60) Provisional application No. 60/513,059, filed on Oct. 21, 2003, provisional application No. 60/536,769, filed on Jan. 15, 2004.

(51) Int. Cl.

| | |
|---|---|
| *A61K 9/14* | (2006.01) |
| *C04B 37/00* | (2006.01) |
| *B41J 2/16* | (2006.01) |
| *C09J 163/00* | (2006.01) |
| *B32B 7/12* | (2006.01) |
| *B27D 1/04* | (2006.01) |
| *B29C 65/00* | (2006.01) |
| *B32B 37/00* | (2006.01) |
| *B32B 38/00* | (2006.01) |
| *C03C 27/10* | (2006.01) |
| *C09J 9/00* | (2006.01) |
| *C09J 9/02* | (2006.01) |
| *C09J 11/04* | (2006.01) |

(52) U.S. Cl.
CPC . *C03C 27/10* (2013.01); *C09J 9/00* (2013.01); *C09J 9/02* (2013.01); *C09J 11/04* (2013.01)
USPC .......... 424/489; 156/325; 156/326; 156/330; 156/327; 156/284; 156/60

(58) Field of Classification Search
CPC .............. A61K 9/14; C09J 11/04; C09J 1/00; C09J 175/00; C09J 133/08; C09J 163/00; C09J 4/00
USPC .......... 424/489; 156/325, 326, 330, 327, 284, 156/60
See application file for complete search history.

(56) References Cited

U.S. PATENT DOCUMENTS

| | | | |
|---|---|---|---|
| 4,061,620 A * | 12/1977 | Gillern ......................... | 524/841 |
| 5,719,016 A * | 2/1998 | Christian et al. .............. | 430/530 |
| 5,788,738 A | 8/1998 | Pirzada et al. .................. | 75/331 |
| 5,851,507 A | 12/1998 | Pirzada et al. ................ | 423/659 |
| 5,910,522 A * | 6/1999 | Schmidt et al. ............... | 523/168 |
| 5,984,997 A | 11/1999 | Bickmore et al. ............. | 75/343 |
| 6,136,156 A * | 10/2000 | El-Shall et al. .......... | 204/157.41 |
| 6,228,904 B1 | 5/2001 | Yadav et al. ................... | 523/210 |
| 6,344,271 B1 | 2/2002 | Yadav et al. ................... | 428/402 |
| 6,402,876 B1 * | 6/2002 | McArdle et al. .............. | 156/247 |
| 6,417,246 B1 | 7/2002 | Jia et al. ......................... | 523/113 |
| 6,451,875 B1 * | 9/2002 | Suga et al. .................... | 523/204 |
| 6,469,086 B1 * | 10/2002 | Neu et al. ...................... | 524/404 |
| 6,569,397 B1 | 5/2003 | Yadav et al. ................... | 423/345 |
| 6,652,967 B2 | 11/2003 | Yadav et al. ................... | 428/403 |
| 6,719,821 B2 | 4/2004 | Yadav et al. ................... | 75/343 |
| 6,832,735 B2 | 12/2004 | Yadav et al. ................... | 241/16 |
| 7,029,507 B2 | 4/2006 | Yadav et al. ................... | 51/307 |
| 2002/0009622 A1* | 1/2002 | Goodson ...................... | 428/703 |
| 2002/0073894 A1* | 6/2002 | Genge et al. .................. | 106/35 |
| 2002/0128336 A1* | 9/2002 | Kolb et al. .................... | 521/50 |
| 2004/0095658 A1* | 5/2004 | Buretea et al. ................ | 359/853 |
| 2004/0139821 A1 | 7/2004 | Yadav ............................. | 75/343 |

OTHER PUBLICATIONS

Gutch et al., KONA, 2002, 20, 24-37.*

* cited by examiner

*Primary Examiner* — Abigail Fisher
(74) *Attorney, Agent, or Firm* — William E. Kuss; Diane R. Meyers

(57) ABSTRACT

Adhesives and sealants comprising submicron particles and nanomaterials, methods of making such adhesives and sealants, and methods of using such adhesives and sealants are provided.

20 Claims, 1 Drawing Sheet

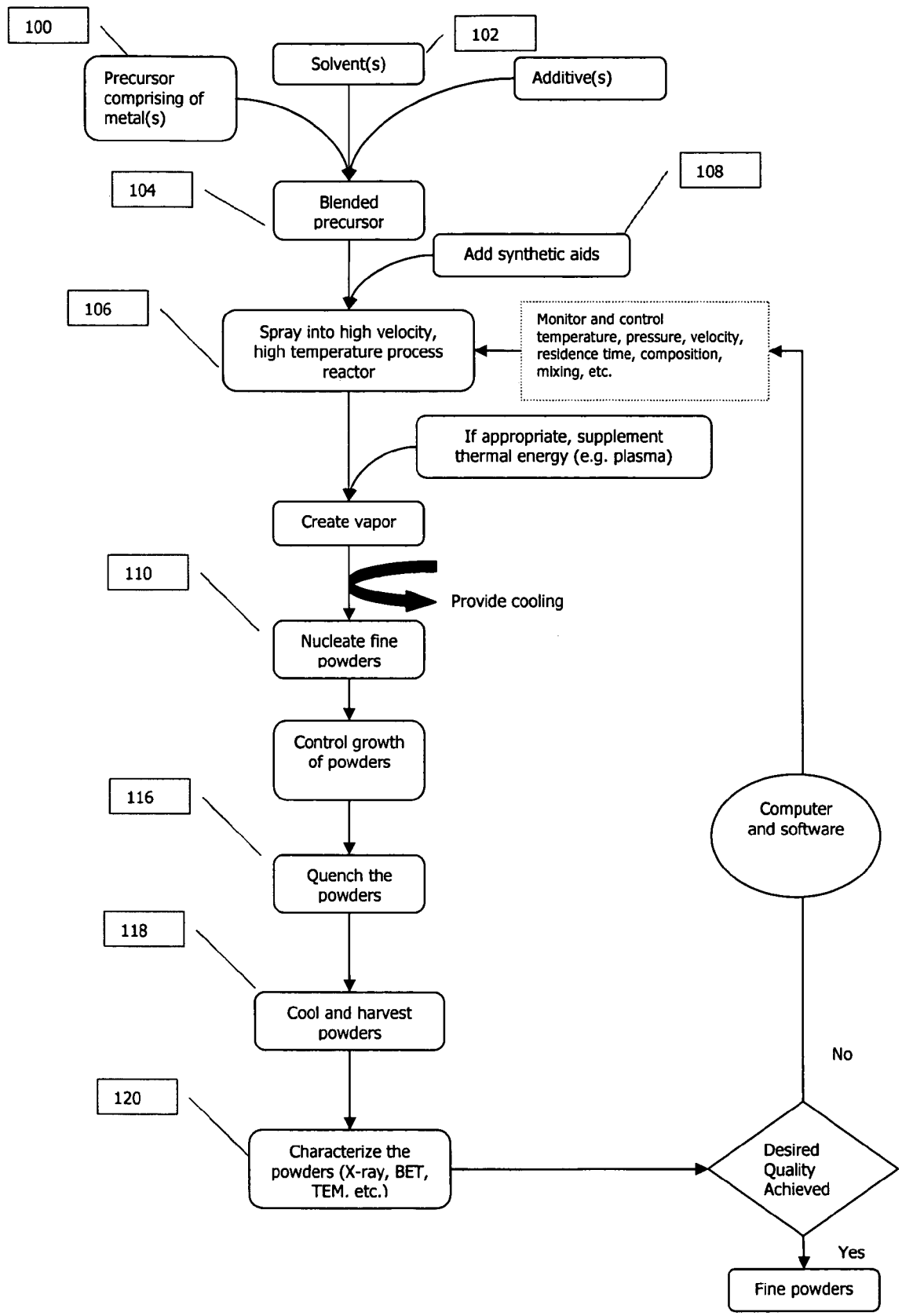

ADHESIVES AND SEALANTS NANOTECHNOLOGY

CROSS-REFERENCE TO RELATED PATENT APPLICATIONS

The present application claims the benefit of provisional application No. 60/513,059 filed Oct. 21, 2003 and provisional application No. 60/536,769 filed Jan. 15, 2004, both of which applications are hereby incorporated by reference in their entirety.

INTRODUCTION

In general, the present invention relates to nanotechnology, adhesives and sealants, methods of manufacturing adhesives and sealants, and applications of such adhesives and sealants.

Adhesives are materials that can hold together two or more solid materials by means of surface attachment. Adhesives compete with many joining technologies such as mechanical fasteners (bolts, screws, rivets, nails). However, fasteners create holes in the items they join and these holes can act as stress concentrators. Fasteners can also be labor intensive. In joining of dissimilar materials, fasteners can facilitate corrosion. Fasteners also add weight to joints and often fail to provide any sealing. Adhesives and sealants are widely used in many industry sectors, because they often provide advantages over mechanical fastening techniques as a result of flexibility, versatility, weight reduction, and/or labor savings.

Adhesives and sealants suffer from some limitations. They have limited shelf lives and typically require clean surfaces to work most effectively. They are often based on resins that degrade with solvents, moisture, light, and/or heat. Adhesive joined and sealed solids often are limited to ambient environment use (extreme temperature, pressure, and chemical environment makes them fail). Adhesives sometimes require curing time and curing energy in the form of ultraviolet (UV), energy beam (EB), or heat. They provide poor strength, modulus and other mechanical properties; once applied, it is difficult to examine the quality of the joint without destructive testing. Thus, conventional adhesives are limited to shear loads less than 20 MPa in most cases, and below 60 MPa in the case of epoxy and phenolic adhesives. Similarly peel loads are limited to values less than 22,500 N/m.

There is a need for technologies that can extend the shelf life, enhance mechanical properties, improve resistance to degradation by heat, light, and/or chemicals, and enlarge application space.

Radiant-cured adhesives are solvent-free adhesives that are cured when exposed to radiant energy. Two of the most widely used curing systems are ultraviolet (UV) and electron beam (EB) systems. UV light-cured adhesives use ultraviolet range of the spectrum light (200-400 nanometers) and photoinitiators to activate the cure. Components of a UV light curing system include a light source, power supply, reflectors, cooling systems to remove heat, and a conveyor to move coated substrate to and from the light source. EB-cured adhesives do not require the use of a photoinitiator. Instead, an electron beam within the equipment exposes the adhesives to low-energy electrons thereby curing the adhesive within seconds. Components of an EB curing system include a control panel, a transformer for voltage, and an electron accelerator.

Radiant-cured adhesives are used primarily for packaging, paper and paperboard, health care, electronics, communications, pressure sensitive tape, and consumer applications. Radiant-cured adhesives can be used on glass, metal, and some plastic materials. Some specific applications of radiant-cured adhesives are glass stemware assembly, the manufacture of headlamps, architectural glass assembly, and lens to metal frame assemblies. UV light cured adhesives are best suited to small scale applications, while EB-cured adhesives are typically more appropriate for high volume operations.

Radiant-cured adhesives are currently not suitable on parts that have complex shapes and materials that will be exposed to additional UV light when in use. It is desired that low-cost UV-curable adhesives be provided that are capable of operating at temperatures above 50° C. that retain bond strength while in use in UV environment.

Waterbased adhesives use water as the carrier fluid, thereby reducing the adhesive's viscosity so that it can be applied to various substrates at varying thicknesses. It is desired that other adhesives offer lower viscosity for similar benefits.

In general, there is a need for adhesives and sealants that can provide superior mechanical properties and durability.

Conventional organics-based adhesives and sealants combust and degrade. The temperature capability of these adhesives and sealants limits the operational conditions in which adhesive-based joints can be utilized to temperatures below 200° C. Adhesives and sealants that can operate at much higher temperatures are desired.

Conventional adhesives and sealants shrink or undergo volume change as they cure. This can cause high stresses and cracks. Technologies are needed that can reduce the thermal expansion and volume shrinkage upon curing.

A number of ceramic adhesives have been developed which offer a service temperature of up to 2200° C. These are based on inorganic binding compounds such as alkali silicates and various metal phosphates and other fillers. These adhesives work like cements. Once all the ingredients have been mixed together in a water-based slurry, chemical reactions occur within the mixture and give rise to refractory bonds. This process occurs slowly at room temperature, but the rate can be increased by heating. It is sometimes necessary to heat to temperatures in excess of 1000° C. before complete curing of the ceramic adhesive occurs. However there is a limitation with ceramic cement-type adhesives technology. Cement is produced at high temperatures and often the cement particles are very coarse (10-1000 microns). Thus, the ceramic adhesive layer thickness can be no smaller than the individual particles—which adds weight, bulk and unusually limits cements to applications where bulk is not an issue. Additionally, slow rates of joint formation or a thermal heating requirement to fully form the bond limits the applications of ceramic adhesives. Technologies are desired that can speed up the cementing process at lower temperatures.

Ceramic adhesives are suitable for bonding metals or ceramics that do not require a hermetic seal or a high reliability. Technologies that can improve the seal and reliability and decrease the adhesive layer thickness are desired.

SUMMARY OF THE INVENTION

Generally, the present invention provides nanoscale materials, methods for manufacturing nanoscale materials, and applications thereof.

Nanopowders in particular and submicron powders in general are a novel family of materials whose distinguishing feature is that their domain size is so small that size confinement effects become a determinant of the materials' performance. Such confinement effects can, therefore, lead to a wide range of commercially important properties. Furthermore, since they represent a whole new family of material precursors where conventional coarse-grain physiochemical mechanisms are not applicable, these materials offer unique combination of properties that can enable novel and multifunctional components of improved performance. Yadav et al. in U.S. Pat. No. 6,344,271 and in co-pending and commonly assigned U.S. patent application Ser. Nos. 09/638,977, 10/004,387, 10/071,027, 10/113,315, and 10/292,263, which along with the references contained therein are hereby incorporated by reference in their entirety, teach some applications of sub-micron and nanoscale powders.

In some embodiments, nanotechnology-enabled adhesives and sealants are provided.

In some embodiments, methods for manufacturing adhesives and sealants comprising nanoparticles are provided.

In some embodiments, adhesives and sealants comprising nanoparticles and nanostructured composites and/or joints prepared from such adhesives and sealants are provided.

In some embodiments, applications of adhesives and sealants comprising nanomaterials are provided.

In some embodiments, methods of joining materials for a variety of applications are provided.

In some embodiments, applications of the methods and compositions provided herein are provided.

In some embodiments, materials and products for optical, sensing, thermal, biomedical, structural, superconductive, energy, security and other uses are provided.

In some embodiments, adhesives and sealants comprising nanoscale powders in high volume, low-cost, and reproducible quality are provided.

BRIEF DESCRIPTION OF THE DRAWINGS

FIG. 1 shows an exemplary overall approach for producing submicron and nanoscale powders useful in preparing the adhesives and sealants provided herein.

DETAILED DESCRIPTION OF THE PREFERRED EMBODIMENTS

This invention is generally directed to adhesives and joining materials comprising nanomaterials in general, and nanoparticles in particular. Nanomaterials include high purity nanomaterials and nanomaterials with aspect ratios different than 1. Particles discussed herein are of mean crystallite size less than 1 micron, more preferably less than 250 nanometers, and most preferably less than 100 nanometers. Methods for producing and utilizing such particles in high volume, low-cost, and reproducible quality are also outlined.

DEFINITIONS

For purposes of clarity the following definitions are provided to aid understanding of description and specific examples provided herein:

"Fine powders", as the term used herein, are powders that simultaneously satisfy the following:

particles with mean size less than 100 microns, preferably less than 10 microns, and particles with aspect ratio between 1 and 1,000,000 (the limits are inclusive of the end points, i.e., 1 and 1,000,000).

For example, in some embodiments, the fine powders are powders that have particles with a mean domain size less than 5 microns and an aspect ratio ranging from 1 to 1,000,000.

"Submicron powders" as used herein, refers to powders with a mean size less than 1 micron and an aspect ratio between 1 and 1,000,000 (the limits are inclusive of the end points, i.e., 1 and 1,000,000). For example, in some embodiments, the submicron powders are powders that have particles with a mean domain size less than 500 nanometers and an aspect ratio ranging from 1 to 1,000,000.

The terms "nanopowders," "nanosize powders," "nanoparticles," "nanocrystals," "nanophase powders," "quantum confined particles" and "nanoscale powders" are used interchangeably and refer to fine powders that have a mean size less than 250 nanometers. For example, in some embodiments, the nanopowders are powders that have particles with a mean domain size less than 100 nanometers and with an aspect ratio ranging from 1 to 1,000,000. "Mean size" as the term is used herein refers to the average crystallite size calculated by Warren-Averbach method from the peak broadening of X-ray diffraction spectra of the powders. If the particle is amorphous or X-ray spectra of crystallites is not obtainable, the term refers to the equivalent spherical diameter calculated from the specific surface area of the powder. The X-ray spectra can be measured using X-ray diffractometer and surface area can be measured using Quantachrome® Surface Area Analyzer.

"Pure powders," as the term is used herein, are powders that have composition purity of at least 99.9 weight %, preferably 99.99 weight % by metal basis. The purity can be measured by atomic absorption, plasma, and/or other methods.

"Nanomaterials" and "nanoscale materials" as the term is used herein, are materials in any dimensional form and with domain sizes of less than 250 nanometers and in some embodiments less than 100 nanometers.

"Domain size," as that term is used herein, refers to the minimum dimension of a particular material morphology. For example, in the case of powders the domain size is the grain size. In the case of whiskers and fibers, the domain size is the diameter. In the case of plates and films, the domain size is the thickness.

"Aspect ratio," as the term is used herein, refers to the ratio of the maximum to the minimum dimension of a particle.

"Precursor," as the term used herein encompasses any raw substance that can be transformed into a powder of the same or different composition. The term includes, but is not limited to, solids, liquids, gases, suspensions, organometallics, organics, inorganics, solutions containing organometallics, dispersions, sols, gels, emulsions, and mixtures.

The terms "powder," "particle," and "grain" are used interchangeably and include, but are not limited to, oxides, carbides, nitrides, borides, chalcogenides, halides, metals, intermetallics, ceramics, polymers, alloys, and combinations thereof. These terms include single metal, multi-metal (also known as mixed metal), and complex compositions. These terms further include hollow, dense, porous, semi-porous, coated, uncoated, layered, laminated, simple, complex, dendritic, inorganic, organic, elemental, non-elemental, crystalline, amorphous, partly crystalline, polymorphous, composite, doped, undoped, spherical, non-spherical, surface functionalized, surface non-functionalized, stoichiometric, and non-stoichiometric forms or substances. Further, the term powder in its generic sense includes one-dimensional materials (fibers, tubes, etc.), two-dimensional materials (platelets, films, laminates, planar, etc.), and three-dimensional materials (spheres, cones, ovals, cylindrical, cubes, monoclinic, parallelolipids, dumbbells, hexagonal, truncated dodecahedron, irregular shaped structures, etc.).

The terms "coating," "film," "layer" and "laminate" are used interchangeably and include, but are not limited to, any deposition comprising submicron and nanoscale domain sizes. The term includes a substrate, surface, deposition, or a combination thereof that is a hollow, dense, porous, semi-porous, coated, uncoated, simple, complex, dendritic, inorganic, organic, composite, doped, undoped, uniform, non-uniform, surface functionalized, surface non-functionalized, thin, thick, pretreated, post-treated, stoichiometric, or non-stoichiometric form or morphology.

"Dispersion," as the term is used herein, encompasses inks, pastes, creams, lotions, Newtonian, non-Newtonian, uniform, non-uniform, transparent, translucent, opaque, white, black, colored, emulsified, with additives, without additives, water-based, polar solvent-based, or non-polar solvent-based mixture of powder in any fluid or fluid-like state of substance.

Unless otherwise noted, steps of the methods described herein may be added, omitted, or otherwise modified. There are no essential method steps unless specifically noted. There is no essential sequence of steps, and the steps may be performed in various permutations and combinations, or they may be combined with steps of different methods discussed. In other words, one of ordinary skill on the art may modify the methods provided herein while still practicing the invention disclosed. Unless otherwise noted, the teachings herein apply equally to both adhesives and sealants even though the teachings herein are sometimes illustrated solely by reference to either adhesive or sealant compositions or methods.

In one embodiment, the present invention provides adhesives and sealants comprising submicron and nanoscale materials. The materials may be inorganic, metallic, alloy, polymer, or composite. Given the natural abundance of nanoparticles in air from volcanic, ocean salt evaporation, and other natural causes in earth's atmosphere and current limitations on purification technologies, it is expected that many commercially produced adhesives and sealants would have naturally occurring nanoparticulate impurities. These impurities are expected to be below 100 parts per million and in most cases in concentration similar to other impurities. Removal of such impurities does not materially affect the properties of an adhesive application. For the purposes herein, adhesives and sealants comprising naturally occurring impurities wherein nanoparticles are present in concentration similar to other elemental impurities are excluded from the scope of this invention. For sake of completeness, it is emphasized that nanoparticles may be intentionally engineered as an additive at concentrations of 100 ppm or less, and these are included in the scope of this patent.

In generic sense, the present invention provides adhesives and sealants comprising nanoscale powders present in at least 100 ppm by weight, in some embodiments greater than 1 weight %, and in some embodiments greater than 10 weight %.

While several embodiments for manufacturing nanoscale and submicron materials for adhesives and sealants are disclosed, for the purposes herein, the nanoscale or submicron materials may be produced by any method or may result as a byproduct from any process.

FIG. 1 shows an exemplary overall approach for the production of submicron materials in general and nanopowders in particular. The process shown in FIG. 1 begins with a raw material (for example, but not limited to, coarse oxide powders, metal powders, salts, slurries, waste product, organic compounds, or inorganic compounds). FIG. 1 shows one embodiment of a system for producing nanoscale and submicron powders in accordance with the present invention.

The process shown in FIG. 1 begins at 100 with a metal-containing precursor such as an emulsion, fluid, particle-containing liquid slurry, or water-soluble salt. The precursor may be evaporated metal vapor, evaporated alloy vapor, a gas, a single-phase liquid, a multi-phase liquid, a melt, a sol, a solution, fluid mixtures, or combinations thereof. The metal-containing precursor may comprise a stoichiometric or a non-stoichiometric metal composition with some part in a fluid phase. In some embodiments, fluid precursors are used over solid precursors, because fluids are typically easier to convey, evaporate, and thermally process, and the resulting product is more uniform.

In one embodiment, the precursors are environmentally benign, safe, readily available, high-metal loading, lower cost fluid materials. Examples of metal-containing precursors suitable for purposes of this invention include, but are not limited to, metal acetates, metal carboxylates, metal ethanoates, metal alkoxides, metal octoates, metal chelates, metallo-organic compounds, metal halides, metal azides, metal carbonates, metal hydroxides, metal nitrates, metal sulfates, metal hydroxides, metal salts soluble in organics or water, and metal-containing emulsions.

In another embodiment, multiple metal precursors may be mixed if complex nanoscale and submicron powders are desired. For example, a copper precursor, an iron precursor and nickel precursor may be mixed to prepare copper nickel ferrite nanoscale powders for magnetic adhesive applications. As another example, a barium precursor, strontium precursor, and titanium precursor may be mixed in correct proportions to yield a high purity nanoscale powder for dielectric adhesive applications. As yet another example, a calcium precursor and silicon precursor may be mixed in correct proportions to yield a nanoscale powder for higher temperature ceramic adhesive applications. As a further example, an aluminum precursor and silicon precursor may be mixed in various proportions to yield aluminum silicate powders for structural adhesive applications. Such complex nanoscale and submicron powders can help create materials with surprising and unusual properties not available through the respective single metal oxides or a simple nanocomposite formed by physical blending powders of different compositions.

In other embodiments, a solvent or another substance is added to the metal comprising precursor in order to modify the flow properties of the precursor or to change the particle morphology, surface, phase, or other characteristics.

It is desirable to use precursors of a higher purity to produce a nanoscale or submicron powder of a desired purity. For example, if purities greater than x % (by metal weight basis) is desired, one or more precursors that are mixed should preferably have purities greater than or equal to x % (by metal weight basis).

With continued reference to FIG. 1, the metal-containing precursor 100 (containing one or a mixture of metal-containing precursors) is fed into a high temperature process 106 implemented using a high temperature reactor, for example. In one embodiment, a synthetic aid such as a reactive fluid 108 can be added along with the precursor 100 as it is being fed into the reactor 106. Examples of such reactive fluids include, but are not limited to, air, and fluids comprising oxygen, nitrogen, carbon, hydrogen, chalcogen, boron, or halogen.

While the above examples specifically teach methods of preparing nanoscale and submicron powders of oxides, the teachings may be readily extended in an analogous manner to other compositions such as carbides, nitrides, borides, carbonitrides, chalcogenides, and other compositions. While in certain embodiments high temperature processing is used, a moderate temperature processing or a low/cryogenic temperature processing may also be employed to produce nanoscale and submicron powders.

The precursor 100 may be also pre-processed in a number of other ways before high temperature thermal treatment. For example, the pH may be adjusted to ensure stable precursor. Alternatively selective solution chemistry such as precipitation may be employed to form a sol or other state of matter. The precursor 100 may be pre-heated or partially combusted before the thermal treatment.

The precursor 100 may be injected axially, radially, tangentially, or at any other angle into the high temperature region 106. As stated above, the precursor 100 may be premixed or diffusionally mixed with other reactants. The precursor 100 may be fed into the thermal processing reactor by a laminar, parabolic, turbulent, pulsating, sheared, or cyclonic flow pattern, or by any other flow pattern. In addition, one or more metal-containing precursors 100 can be injected from one or more ports in the reactor 106. The feed spray system may yield a feed pattern that envelops the heat source or, alternatively, the heat sources may envelop the feed, or alternatively, various combinations of this may be employed. On one embodiment, the feed is atomized and sprayed in a manner that enhances heat transfer efficiency, mass transfer efficiency, momentum transfer efficiency, and/or reaction efficiency. In one embodiment, the feed is sprayed with a gas wherein the gas velocities are maintained between 0.05 mach to 10 mach. The reactor shape may be cylindrical, spherical, conical, or any other shape. Methods and equipment such as those taught in U.S. Pat. Nos. 5,788,738, 5,851,507, and 5,984,997, each of which is specifically incorporated herein by reference in its entirety, can be employed in practicing the methods of this invention.

With continued reference to FIG. 1, after the precursor 100 has been fed into reactor 106, it can be processed at high temperatures to form the product powder. The thermal treatment is done, in some embodiments, in a gas environment with the aim to produce a product such as powders that have the desired porosity, density, morphology, dispersion, surface area, and composition. This step produces by-products such as gases. To reduce costs, these gases may be recycled, mass/heat integrated, or used to prepare the pure gas stream desired by the process.

In embodiments using high temperature thermal processing, the high temperature processing may be conducted at step 106 (FIG. 1) at temperatures greater than 1500 K, in some embodiments greater than 2500 K, in some embodiments greater than 3000 K, and in some embodiments greater than 4000 K. Such temperatures may be achieved by various methods including, but not limited to, plasma processes, combustion, pyrolysis, electrical arcing in an appropriate reactor, internal energy, and combinations thereof. The plasma may provide reaction gases or may provide a clean (inert) source of heat. Different vapors comprising additional elements may be added to other vapors to prepare complex compositions.

With continued reference to FIG. 1, the high temperature process 106 results in a vapor comprising the elements in the precursor. After the thermal processing, this vapor is cooled at step 110 to nucleate and form submicron powders, in certain embodiments nanopowders. In some embodiments, the cooling temperature at step 110 is high enough to prevent moisture condensation. The particles form because of the thermokinetic conditions in the process. One of ordinary skill in the art may engineer the process conditions, such as pressure, residence time, temperature, supersaturation and nucleation rates, gas velocity, flow rates, species concentrations, diluent addition, degree of mixing, momentum transfer, mass transfer, and heat transfer, the morphology, crystallinity, surface and other characteristics of the nanoscale and submicron powders. It is important to note that the focus of the process should be on producing a powder product that excels in satisfying the end application requirement and customer needs.

After cooling, in some embodiments, the powder is quenched to lower temperatures at step 116 to minimize or prevent agglomeration or grain growth. Suitable quenching methods include, but are not limited to, methods taught in U.S. Pat. Nos. 5,788,738 and 6,569,397 both of which are hereby incorporated by reference in full. In some embodiments, sonic to supersonic quenching is employed. In other embodiments, coolant gases, water, solvents, cold surfaces, or cryogenic fluids might be employed. In certain embodiments, quenching methods are employed which can prevent deposition of the powders on the conveying walls. These methods may include, but are not limited to, electrostatic means, blanketing with gases (e.g. sweep), the use of higher flow rates, mechanical means, chemical means, electrochemical means, or sonication/vibration of the walls.

In some embodiments, the high temperature processing system includes instrumentation and software that can assist in the quality control of the process. Furthermore, in certain embodiments the high temperature processing zone 106 is operated to produce fine powders 120, in certain embodiments submicron powders, and in certain embodiments nanopowders. The gaseous products from the process may be monitored for composition, temperature, and other variables to ensure quality at step 112. The gaseous products may be recycled to be used in process 108 or used as a valuable raw material when nanoscale and submicron powders 120 have been formed, or they may be treated to remove environmental pollutants if any. Following quenching step 116, the nanoscale and submicron powders may be cooled further at step 118 and then harvested at step 120.

The product nanoscale and submicron powders 120 may be collected by any method. Suitable collection means include, but are not limited to, bag filtration, electrostatic separation, membrane filtration, cyclones, impact filtration, centrifugation, hydrocyclones, thermophoresis, magnetic separation, and combinations thereof. In one embodiment, a cake of the nanopowder is formed on the collection media, which then acts as an efficient collector capable of collecting with efficiencies greater than 95%, in certain embodiments greater than 99%.

The quenching at step 116 may be modified to enable preparation of coatings. In this embodiment, a substrate may be provided (in batch or continuous mode) in the path of the quenching powder containing gas flow. By engineering the substrate temperature and the powder temperature, a coating comprising the submicron powders and nanoscale powders can be formed.

A coating, film, or component may also be prepared by dispersing the fine nanopowder with adhesive or sealant formulations and then applying various known methods such as but not limiting to electrophoretic deposition, magnetophoretic deposition, spin coating, dip coating, spraying, brushing, screen printing, ink-jet printing, and the like. The nanopowders may be thermally treated or reacted to enhance their electrical, optical, photonic, catalytic, thermal, magnetic, structural, electronic, emission, processing, or forming properties before such a step.

The intermediate or product at any stage of the process, or similar process based on modifications by those skilled in the art, may be used directly as feed precursor to produce nanoscale or fine powders by methods such as, but not limited to, those taught in commonly owned U.S. Pat. Nos. 5,788,738, 5,851,507, 5,984,997, and co-pending U.S. patent application Ser. Nos. 09/638,977 and 60/310,967, each of which is hereby incorporated by reference in its entirety. For example, a sol may be blended with a fuel and then utilized as the feed precursor mixture for thermal processing above 2500 K to produce nanoscale simple or complex powders. In other embodiments, surfactants may be employed with the precursor. Synthetic aids help control the morphology, size, distribution, state, shape, surface and bulk composition, porosity, and other characteristics of the powder.

In summary, one embodiment for manufacturing nanoparticles for adhesives and sealants, comprises (a) preparing a fluid precursor comprising a metal; (b) spraying the precursor into a high temperature reactor with a gas wherein the gas velocity is maintained at velocities greater than 0.05 mach, preferably greater than 0.25 mach; (c) combusting and immediately processing the spray in a high temperature reactor operating at high temperatures; (d) wherein, in the said high temperature reactor, the precursor converts into vapor comprising the metal; (e) cooling the vapor to nucleate submicron or nanoscale powders; (f) quenching the powders at gas velocities exceeding 0.1 Mach to prevent agglomeration and growth; (g) separating the quenched powders from the gases and collecting the powders; (h) preparing an adhesive or sealant comprising the collected powders.

Another embodiment for manufacturing nanoscale powders for adhesives and sealants comprises (a) preparing a fluid precursor comprising two or more metals, at least one of which is in concentration greater than 100 ppm by weight; (b) spraying the precursor into a high temperature reactor with a gas wherein the gas velocity is maintained at velocities greater than 0.05 mach, preferably greater than 0.25 mach; (c) processing the spray in a high temperature reactor; (d) wherein, in the said high temperature reactor, the said precursor converts into vapor comprising the metal; (e) cooling the vapor to nucleate submicron or nanoscale powders; (f) quenching the powders at gas velocities exceeding 0.1 Mach to prevent agglomeration and growth; (g) separating the quenched powders from the gases.

The powders produced by the teachings herein may be modified by post-processing as taught by commonly owned U.S. patent application Ser. No. 10/113,315 which is hereby incorporated by reference in its entirety.

Nanoscale materials can be reacted with various reagents to modify the functional groups on their surface. For example, nanomaterials can be reacted with Acetoxypropyltrimethoxysilane, (3-Acryloxypropyl)Trimethoxysilane with or without inhibition with MEHQ, 3-(N-Allylamino)Propyltrimethoxysilane, Allyloxyundecyltrimethoxysilane, Allyltrimethoxysilane, (Aminoethylaminomethyl)phenethyltrimethoxysilane, N-(2-Aminoethyl)-3-Aminopropylmethyldimethoxysilane, N-(2-Aminoethyl)-3-Aminopropyltrimethoxysilane, N-[3-(Trimethoxysilyl)-Propyl]Ethylenediamine, 3-Aminopropylmethyldiethoxysilane, 3-Aminopropyltriethoxysilane, Bis(2-Hydroxyethyl)-3-Aminopropyltriethoxysilane in ethanol, Bis(Triethoxysilyl)Ethane Hexaethoxydisilethylene, Bis[3-(Triethoxysilyl)Propyl]-Tetrasulfide, Bis(Trimethoxysilylpropyl)Amine, n-Butylaminopropyltrimethoxysilane, ((Chloromethyl)Phenylethyl)-Trimethoxysilane, (p-Chloromethyl) Phenyltrimethoxysilane, 3-Chloropropylmethyldimethoxysilane, 3-Chloropropyltrimethoxysilane, 2-Cyanoethyltriethoxysilane, [2-(3-Cyclohexenyl)Ethyl]Trimethoxysilane, Di-s-Butoxyaluminoxytriethoxysilane, Di-t-Butylsilane, Dodecyltriethoxysilane, Ethyltriacetoxysilane, Ethyltrimethoxysilane, (3-Glycidoxypropyl)Methyldiethoxysilane, (3-Glycidoxypropyl)Trimethoxysilane 3-(2,3-Epoxypropoxy)Propyltrimethoxysilane, (Heptadecafluoro-1,1,2,2-Tetrahydrodecyl)Triethoxysilane, Hydroxymethyltriethoxysilane, Triethoxysilymethanol, Isobutyltrimethoxysilane, Trimethoxysilyl-2-Methylpropane, 3-Isocyanatopropyltriethoxysilane, Methacryloxypropyltrimethoxysilane, 2-[Methoxy(Polyethyleneoxy)Propyl]-Trimethoxysilane, N-Methylaminopropyl methyldimethoxysilane, N-Methylaminopropyltrimethoxysilane, 1-Napthyltrimethoxysilane, Octadecyldimethyl(3-Trimethoxysilylpropyl) Ammonium Chloride, dissolved in an organic solvent, n-Octadecyltrimethoxysilane, n-Octyltriethoxysilane, Phenyltriethoxysilane, Phenyltrimethoxysilane, O-(Propargyloxy)-N-(Triethoxysilylpropyl)urethane, n-Propyltriethoxysilane, Siliclad Octadecyl Functional Silane, Tetraethoxysilane, (Tridecafluoro-1,1,2,2-Tetrahydrooctyl)Triethoxysilane, Triethoxyfluorosilane, (3,3,3-Trifluoropropyl)Trimethoxysilane, N-(3-Trimethoxysilylpropyl)Pyrrole, Ureidopropyl triethoxysilane dissolved in alcohols, Ureidopropyl trimethoxysilane, (m,p-Vinylbenzyloxy)Trimethylsilane, Vinyltriethoxysilane, Hexamethyl disilazane, organic titanates (e.g. DuPont Tyzor®), organic zirconates (e.g. n-butyl zirconate, zirconium citrate ester, triethanolamine zirconate, etc.). In certain embodiments, hydrolysis of these and other compounds of metals such as titanium and zirconium, organometallics, acids, bases, amines, halides, organics is performed prior to or in-situ when these are mixed with nanoscale materials. Adjustments of temperature, pressure, pH and other reaction conditions can be useful in certain embodiments.

In other embodiments, solution approaches to manufacturing nanomaterials, such as those taught in co-pending and co-owned U.S. patent application Ser. No. 10/755,024, may be employed. This application is hereby incorporated by reference in its entirety.

One embodiment using the solution approach to producing nanomaterial in general and nanoparticles in particular comprises (a) preparing a precursor comprising at least one desired metal in a solvent. The precursor may be a nitrate, halide, alkoxide, phosphate, sulfide, and the like, such as those discussed herein; the solvent may be water, alcohols, ketones, aldehydes, ethers, acetates, glycols, glycerols, aromatic, aliphatic, polar, non-polar, ionic liquid, supercritical fluids, and the like, such as those discussed herein. Mixtures of precursors and/or solvents may be used. (b) Adding at least one synthetic aid, such as a surfactant, acid, alkali, supercritical fluid, organometallic and the like; (c) adding a reagent to the precursor wherein the reagent provides, or generates through a physical process, such as desorption and the like, or creates through chemical/electrochemical reaction and the like, a precipitating species. The precipitating species may be OH$^-$, polyol, H$^+$, or an oxidizing, reducing, or complexing species, for example. In some embodiments, the reagent and precursor are processed in a manner that provides plug flow index greater than 5 in some embodiments, greater than 50 in some embodiments; and greater than 500 in some embodiments. The term plug flow index is defined in commonly owned U.S. patent application Ser. No. 10/755,024, which application is hereby incorporated by reference in its entirety. In some embodiments, the reagent is added or created in a manner where the concentration of the precipitating species is less than or equal to the concentration of the reagent and where the availability of precipitating species is rate limiting or a contributor to the rate (contribution is greater than 5% in some embodiments and it is greater than 50% in some embodiments). In some embodiments, the availability of precipitating species is kinetically controlled or blocked (through temperature, surfactant, silanes, and the like) to make it rate limiting or contributing. (d) Letting the precipitating agent and precursor react and form nanoscale matter comprising the desired metal(s); and (e) collecting the product formed.

As an illustration, titanium comprising nanoparticles may be prepared from titanium chloride, titanium oxy nitrate, or titanium oxy chloride precursor by reacting it with urea solution wherein the urea is thermally decomposed by boiling the solution to yield $CO_2$, $NH_4^+$, and $OH^-$; the titanium precursor then reacts with the precipitating species to produce titanium comprising nanoparticles.

As another non-limiting illustration, titanium comprising nanoparticles may be prepared from titanium chloride or titanium alkoxide (or other) precursor by passing a solution comprising the precursor through an ion-exchange resin, such as in a column, typically a strong base resin, wherein the resin releases $OH^-$ species and exchanges it for $Cl^-$ species. The $OH^-$ precipitating species is released more homogeneously and at a rate such that nanoparticles of uniform size and other characteristics are formed and collected. The exhausted column may be regenerated and reused. In certain embodiments, organometallic coupling agents, such as zirconium alkoxide, silanes, aluminum alkoxides and the like, may be used to control, retard, or stop surface growth on one, several, or all grain boundaries of the nanoparticles' nucleation or grain growth.

As another non-limiting illustration, titanium comprising nanoparticles may be prepared from a salt precursor dissolved in a solvent; passing the solution comprising the precursor through an ion-exchange resin, such as in a column, typically a strong acid resin, wherein the resin releases a species, such as $H^+$ species, and exchanges it for another species, such as $Na^+$ species. The precipitating species is released more homogeneously and at a rate such that nanoparticles of uniform size and other characteristics are formed and collected. Plug flow is desirable in some embodiments. The product stream from the bed is a dispersion product useful in a variety of applications. In other embodiments, the dispersion may be further processed to yield useful products. The exhausted column may be regenerated and reused.

Surfactants (or substances that react to one or more functional groups on the surface of the precipitating nanoscale powder) may be combined with the solution prior to, during, or after precipitation or ion-exchange over adsorbents, resins, or chelating matter to control the characteristics and properties of the powder. Variables such as temperature, pressure, mixing, residence time, diluents, recycle rates, feed position, recycle position, reflux strategies, pH, composition, charge flow, voltage, and the like offer means to improve or modify the powder characteristics for specific applications. These variables may be readily adjusted by one of ordinary skill in the art to achieve desired characteristics. These variables may be controlled to obtain nanomaterials of specific characteristics desired for different applications. Solvents or synthetic aids may be employed that interact with the nanoparticle nucleation step and/or growth step or those that remove or chelate byproducts of the nanoparticle formation chemistry to assist the control of nanomaterial preparation. A non-limiting illustration of a substance that reacts with surface hydroxyl functional group is a molecule comprising silanol.

Nanoparticles may be reacted with other compounds to alter the surface characteristics of the nanoparticles or produce a new composition. For example, nanoparticles may be reacted to form functional groups on the surface of the nanoparticles that are desirable for a specific application. In addition, nanoparticles may be used in reactions to produce new compositions. For example, the nanoparticles of the present invention may be used as catalysts, or they may be used as reactants. Prior to their use or in formulation, nanoparticles may be reacted on the surface, partly with the bulk, or completely with a wide variety of compounds, such as, but not limited to, acids, bases, organics, inorganics, halogen containing compounds, oxygen containing compounds, silicon containing compounds, carbon containing compounds, and/or nitrogen containing compounds. The reactants may be in any form, such as solid, liquid, gas, plasma, slurry, emulsion, or sol.

Methods for Incorporating Nanoparticles into Adhesives and Sealants

Submicron and nanoscale powders may be incorporated into an adhesive or sealant formulation and adhesive-based joint by any method. Some non-limiting exemplary methods for formulating non-surface treated and surface treated nanomaterials into resins are taught in a commonly owned U.S. Pat. No. 6,228,904 which is hereby incorporated by reference in its entirety.

In one embodiment, nanomaterials are incorporated into adhesive by (a) preparing nanoscale or submicron materials, such as nanopowders, nanotubes, or nano-platelets; (b) providing resin or powder of adhesive; (c) mixing the nanoscale or submicron materials with the resin or powders of adhesive by milling, shear mixing, blending or any other technique; (d) applying the adhesive to surfaces that need to be joined; (e) applying pressure, temperature, voltage, radiation, or a combination of these to the surfaces while the adhesive cures. In another embodiment, the nanoscale or submicron materials are pretreated to functionalized the powder surface for ease in dispersability and/or to ensure homogeneity. In a further embodiment, ultraviolet (UV) or electron beam curing of the adhesive comprising nanoscale powders and plastic powders is employed to prepare useful products.

Nanoparticles may sometimes be difficult to disperse in adhesive and sealant formulations. In one embodiment, the dispersability of the nanoparticles is enhanced by treating the surface of the oxide powders or other non-oxide compositions. To illustrate but not limit, fatty acids (e.g. quaternary ammonium complexes, hydroxides, propionic acid, stearic acid and oils) may be applied to or with the nanoparticles to enhance the surface compatibility. If the powder has acidic surface, ammonia, quaternary salts, or ammonium salts may be applied to the surface to achieve desired surface pH. In other cases, acetic acid or organic acid or silicon-containing compounds may be used to clean, modify, and/or functionalize the surface of the nanomaterial. Trialkyl phosphates and phosphoric acid is additionally applied in some applications to reduce dusting and chemical activity.

Given the numerous applications of adhesives and sealants, the quantity, particle size, size distribution, surface, morphology, crystallinity, phase and composition of the nanoparticles added to adhesives and sealants may be optimized to meet the specific application requirements. This may be done using partial or full factorial design of experiments. Nanoparticles of various characteristics are first prepared by methods taught herein or by any other method. Next the nanoparticles are incorporated in an adhesive or sealant. The multiple factors of performance of the adhesive are then measured, and the nanoparticle characteristic that gives the best combination of superior performance and acceptable cost of ownership is selected. In certain embodiments, the performance testing protocols used are those recommended by standards such as the ASTM, European Union, Japan, and ISO standards. In applications where the adhesives and sealants are expected to compete for structural or other higher performance applications, tests that apply to the entire product may be conducted. To illustrate but not limit, some such testing protocols include:

ASTM D905 Strength Properties of Adhesive Bonds in Shear by Compression Loading

ASTM D1101 Integrity of Adhesive Joints

ASTM D2339 Strength Properties of Adhesives

ASTM D2559 Standard Specification for Adhesives

ASTM E70 for pH measurement, ASTM D489 for Total Solids measurement, ASTM D2556 and D3236 for viscosity measurements ASTM D882 and D3759 for Tensile and Elongation Properties ASTM D1004 for measuring Tear Resistance ASTM D3121 and D2979 for testing Tack and Adhesion ASTM D6195 for T-Peel measurements ASTM D1876 for measuring Shear Resistance ASTM D3330 and D6252 for measuring Peel Adhesion TAPPI T-543 for measuring Stiffness and TAPPI T-425 for Opacity measurements ASTM D3165 Strength Properties of Adhesives in Shear by Tension Loading of Single-Lap-Joint Laminated Assemblies ASTM D5868 Lap Shear Adhesion for Fiber Reinforced Plastic Bonding ASTM D2344 Short-Beam Strength of Polymer Matrix Composite Materials and Their Laminates ASTM D2584 Ignition Loss of Cured Reinforced Resins ASTM D3039 Tensile Properties of Polymer Matrix Composite Materials ASTM D3410 Compressive Properties of Polymer Matrix Composite ASTM D3479 Tension-Tension Fatigue of Polymer Matrix Composite Materials ASTM D3518 In-Plane Shear Response of Polymer Matrix Composite Materials ASTM D256 Determining the Izod Pendulum Impact Resistance of Plastics ASTM D638 Tensile Properties of Plastics ASTM D695 Compressive Properties of Rigid Plastics ASTM D696 Coefficient of Linear Thermal Expansion of Plastics ASTM D790 Flexural Properties of Unreinforced and Reinforced Plastics and Electrical Insulating Materials ASTM D792 Density and Specific Gravity of Plastics ASTM D953 Bearing Strength of Plastics ASTM D3846 In-Plane Shear Strength of Reinforced Plastics ASTM D4812 Unnotched Cantilever Beam Impact Strength of Plastics ASTM D6109 Flexural Properties of Unreinforced and Reinforced Plastic Lumber ASTM D6110 Determining the Charpy Impact Resistance of Notched Specimens of Plastics Each of these ASTM standards is hereby incorporated by reference in its entirety.

One of the several motivations behind using nanoparticles in adhesives and sealants is that the microstructure of roughness of the surfaces that need to be bonded is very small. The use of particles smaller than the dimensions of such roughness, i.e. nanoparticles, and forming a nanocomposite that provides pinning point for stresses and prevention of propagation of cracks within the nanocomposite (or in other embodiments surface contact to transfer thermal phonons, electrons, etc. from one bonded surface to the particles to the other bonded surface) provides useful adhesives and sealants for a variety of applications. As a generic guidance, the submicron materials added to the formulation may have a mean size that is 50% or less than the maximum of the root-mean-square roughness and the average wavelength of roughness. In case the roughness of surfaces to be bonded is not characterized or known, the particles used may comprise nanoparticles or other morphologies of nanomaterials.

In adhesive and sealants applications, a surprising benefit of the compositions and methods taught herein is that the viscosity of the resin can be tailored using the nanoparticles. With discrete non-agglomerated nanoparticles, loadings as high as 90% by weight can be achieved with workable viscosities. This helps ease processing, provides low cost, high reliability and high speed automated product assembly operations. If higher viscosities are desired, the nanoparticles taught herein may be agglomerated (by heating or mechanically, for example) preferably in a necklace type morphology, but any other suitable morphology may also be used.

Epoxy Resins:

In one embodiment, epoxy resin adhesives are prepared by mixing nanoparticles (inorganic, metal, alloy, or polymer) to bisphenol A, to epichlorohydrin, and/or both before they react. In other embodiments, the molecular weight of diglycidyl ether of bisphenol may be modified with functionalities such as oxirane or hydroxyl end. In certain embodiments, elastomers (such as butadiene-acrylonitrile, nitrile rubbers, acrylic elastomers, etc.) are present in the epoxy resins to improve fracture resistance. The nanoparticles mixed in may be single-metal or multi-metal oxides, carbides, borides, nitrides, elemental, metals, alloys, intermetallics, oxycarbides, oxynitrides, carbonitrides, chalcogenides, suicides, halides, phosphates, sulfates, or carbonates. The nanoparticles may be electrically conducting ($>10^{-6}$ S/cm), thermally conducting ($>10^{-4}$ W/m-K), thermochromic (between 175 to 1000 K), gas barrier, fluorescent, magnetic, pigments, electrically insulating, thermally insulating, non-magnetic, transparent, white, UV absorbing (>50% absorption of UV-A and/or UV-B and/or UV-C), IR reflective (>5% infrared energy reflected), phosphor, hard (>2.5 mhos), ductile, dielectric, current limiting, voltage limiting, abrasive, electrochemical, or combinations thereof. In certain embodiments, the nanoparticles comprise an antimicrobial, a pharmaceutical, a drug delivery vehicle, a biologically active composition of matter, a nutrient and/or nutrient delivery vehicle, a wound-care composition, a wound-healing composition, a thermally sensitive composition, sensors, and/or phase change compositions. In certain embodiments, the nanoparticles comprise perfumes, fragrances, cosmetic, caution-triggering odors, flavors, taste triggering, enzymes, and other bio-active substances. In certain embodiments, the nanoparticles are spherical, fibrous, nanotubes, nanorods, nanoflakes, nanoplates, nanowhiskers, cones, laminated, hollow, dense, smooth, rough, dendrimers, core-shell, layered, non-uniform, gradient, and combinations thereof. The nanoparticle comprising adhesive so prepared offer properties that are in some or large part a function of the nanoparticles; to illustrate, in some embodiments, the adhesive nanocomposite is electrically conducting ($>1^{-8}$ S/cm), thermally conducting ($>10^{-6}$ W/m-K), thermochromic (between 175 to 1000 K), gas barrier, fluorescent, magnetic, pigments, electrically insulating, thermally insulating, non-magnetic, transparent, white, UV absorbing (>50% absorption of UV-A and/or UV-B and/or UV-C), IR reflective (>5% infrared energy reflected), phosphor, hard and mar resistant, ductile, dielectric, current limiting, voltage limiting, abrasive, electrochemical, fragrant, flavorful, thermally sensitive, healing, bioactive, anti-microbial or combinations thereof.

For curing, the reaction of the epoxy resin comprising nanoparticles may be done with amines, anhydrides, imidazoles, and/or mercaptans with or without catalysts such as, but not limited to, tris(dimethylamino)phenol. Other curatives, such as but not limited to, dicyanodiamide, complexes of Lewis acids, diaminodiphenylsulfones, complex of organic compounds with transition metals, diisocynates, amines are used in embodiments where curing needs to occur between 100 to 250° C.

In some embodiments, between 0.1% to 10% by weight (higher or lower levels may be employed) nanoparticles are mixed into the epoxy resin before it is combined with a hardener (such as amines). This may be useful where improvements in structural and surface properties are desired with negligible modification of visual appearance. For structural properties, nanoparticles comprising single metal or multi-metal silicon oxides, aluminum oxides, zirconium oxides, titanium oxides, rare earth oxides, and combinations thereof may be used. Specific structural and surface properties that can be modified by this technique include strength, hardness, stiffness, toughness, scratch resistance, thermal shock resistance, retained scratch resistance, wear resistance, acid etch resistance, chip resistance and the like. In addition, with surface functionalized nanoparticles, hydrophobicity, anti-slip, anti-microbial, UV-resistance, anti-mold, anti-fungal, low friction, low static charge, conductive, and the like formulations are achieved.

In other embodiments where improvements in higher structural and surface properties are desired and where slight modification of visual appearance is acceptable, between 8% to 30% (higher or lower levels may be employed) by weight nanoparticles, in some embodiments, between 15% to 25% by weight nanoparticles, are mixed into the epoxy resin before it is combined with a hardener. For structural properties, nanoparticles comprising simple or complex silicon oxides, aluminum oxides, zirconium oxides, titanium oxides, rare earth oxides, and combinations thereof may be used. Specific structural and surface properties that can be modified by this technique include strength, hardness, stiffness, toughness, scratch resistance, thermal shock resistance, retained scratch resistance, wear resistance, acid etch resistance, chip resistance, and the like. In addition, with surface functionalized nanoparticles, hydrophobicity, anti-slip, anti-microbial, UV-resistance, anti-mold, anti-fungal, low friction, low static charge, conductive, flavor, fragrance, and the like formulations may be achieved.

In other embodiments, between 17% to 80% (higher or lower levels may be employed) by weight nanoparticles, in some embodiments between 40% to 60% by weight nanoparticles, are mixed into epoxy resin before it is combined with a hardener. This may be useful where improvements in structural and surface properties are desired and where some modification of visual appearance is acceptable. Specific structural and surface properties that can be modified by this technique include strength, hardness, stiffness, toughness, scratch resistance, thermal shock resistance, retained scratch resistance, wear resistance, acid etch resistance, chip resistance, and the like. In addition, with surface functionalized nanoparticles, hydrophobicity, anti-slip, anti-microbial, UV-resistance, anti-mold, anti-fungal, low friction, low static charge, conductive, flavor, perfume, and the like formulations may be achieved.

In applications where short term fire resistance is needed, nanoparticles comprising antimony oxides, aluminum trihydrate, stannates (e.g. zinc tin oxides), silicates, salts with high water of hydration, boron oxides, halides, and combinations thereof are compounded in the epoxy resin before it is combined with a hardener. These nanoparticles suppress the propagation of flame species and radicals because of their high surface areas and ability to compound with these radicals; alternatively they release moisture which suppresses the propagation of the fire chemistry.

In applications where thermal or electrical conductivity is desired in the adhesive or sealant, nanoparticles comprising antimony doped tin oxide, indium tin oxide, other doped oxides, silver coated powders, gold coated powders, copper coated powders, precious metals, doped or undoped borides, doped or undoped nitrides, doped or undoped chalcogenides, doped or undoped carbides, sub-oxides of metals, elements (such as zinc, carbon, copper, tin), doped carbon and combinations of these are compounded in the epoxy resin before it is combined with a hardener. Where lower loadings of nano-additives is desired for cost and/or performance reason, nanoparticles with an aspect ratio greater than 1 are used in some embodiments, nanoparticles with an aspect ratio greater than 15 are used in some embodiments, nanoparticles with an aspect ratio greater than 75 are used in some embodiments, and nanoparticles with an aspect ratio greater than 1000 are used in some embodiments. Tubular, fibrous, rod-shaped, platelet-shaped, etc. nanoparticles with high aspect ratios provide greater numbers and probability of contact points and percolate at a lower loading.

In applications where thermal or electrical insulation properties are desired in the adhesive or sealant, nanoparticles comprising insulators and dielectrics are compounded in the epoxy resin before it is combined with a hardener. To illustrate, but not limit, aluminum oxide, zirconium oxide, rare earth oxides, titanium oxide, multi-metal titanium oxides, multi-metal silicon oxides, glasses, may be useful.

In applications where magnetic properties are desired in the adhesive or sealant, nanoparticles comprising iron oxide, copper iron oxide, zinc iron oxide, copper zinc iron oxide, nickel ferrite, cobalt ferrite, barium ferrite, strontium ferrite, iron garnets, iron spinels, other ferrites, rare earth ferrites, rare earth alloys of iron, rare earth alloys of nickel, rare earth alloys of cobalt, NdFeB, $SmCo_5$, metals, alloys, borides, carbides, oxyborides, boronitrides, nitrides, oxynitrides, other compounds comprising iron, nickel, cobalt or elements with magnetic moment, and combinations thereof are compounded in the epoxy resin before it is combined with a hardener. In some embodiments, nanoparticles with an aspect ratio greater than 1 are used.

In applications where color properties are desired, nanoparticles of inorganic color pigments (blue, yellow, red, pink, brown, black, white, violet, cyan, orange, green, fluorescence) may be compounded in the epoxy resin before it is combined with a hardener. Organic dyes or wax nanoparticles can also be employed. In applications where transparency with or without a color is important, the nanoparticle may have an average particle size of less than 60 nanometers, less than 40 nm in some embodiments, and less than 20 nm in some embodiments. At these sizes, the particle size is substantially smaller than the visible wavelengths of light (400-700 nm) and this leads to surprising exhibition of transparency in adhesives and sealants.

In some embodiments nanoparticles comprising Ag, Cu, Zn, Au, Pt, Pd, Ir, Ru, V, Ca, K, Na, Sn, Sb, Bi, rare earths, organic biocides, or alloys, compounds, or composites containing one or more of these elements may be preferably compounded in the epoxy resin before it is combined with a hardener. These adhesives may be useful in applications where antimicrobial properties are desired. Such adhesives can enhance the life and reliability of adhesives where they may be prone to rapid degradation due to the presence of moisture and microbial action. In other embodiments, the surface of these nanoparticles is functionalized, coated, or utilized to carry organics, genetic material, antigens, antibodies, diagnostic agents, disease prevention agents, markers, nutrients, or drugs in wound care and other health care applications using techniques, such as those taught in U.S. Pat. No. 6,228,904, which is hereby incorporated by reference in its entirety. In certain embodiments, antimicrobial, pharmaceuticals and/or drug delivery vehicle, biologically active composition of matter, nutrient and/or nutrient delivery vehicle, wound-care, wound-healing, thermally sensitive, sensors, and/or phase change compositions comprise nanoparticles. In certain embodiments, perfumes, fragrances, cosmetic, caution-triggering odors, flavors, taste triggering, enzymes, and other bio-active substances comprise nanoparticles.

Phenolic Resins:

In some embodiments, resole or novolac phenolic resin adhesives are prepared by mixing nanomaterials (inorganic, metal, alloy, or polymer) with phenol before it reacts with formaldehyde with or without the presence of a catalyst and/or curing agent, such as hexamethylenetetramine and/or elastomers (e.g. acrylonitrile-butadiene, acetals). The nanoscale materials mixed in may be single-metal or multi-metal oxides, carbides, borides, nitrides, elemental, metals, alloys, intermetallics, oxycarbides, oxynitrides, carbonitrides, chalcogenides, silicides, halides, phosphates, sulfates, or carbonates. The nanoparticles can be electrically conducting ($>10^{-6}$ S/cm), thermally conducting ($>10^{-4}$ W/m-K), thermochromic (between 175 to 1000 K), gas barrier, fluorescent, magnetic, pigments, electrically insulating, thermally insulating, non-magnetic, transparent, white, UV absorbing ($>50\%$ absorption of UV-A and/or UV-B and/or UV-C), IR reflective ($>5\%$ infrared energy reflected), phosphor, hard ($>2.5$ mhos), ductile, dielectric, current limiting, voltage limiting, abrasive, electrochemical, or combinations thereof. In certain embodiments, the nanoscale materials comprise antimicrobial, drug delivery vehicle, nutrient, wound-healing, thermally sensitive, sensors, and/or phase change compositions. In certain embodiments, the nanoscale materials are spherical, fibrous, nanotubes, nanorods, nanoflakes, nanoplates, nanowhiskers, cones, laminated, hollow, dense, smooth, rough, dendrimers, core-shell, layered, non-uniform, gradient and combinations thereof. The adhesives comprising nanoparticles so prepared may offer properties that are in some or large part a function of the nanoparticles; to illustrate, the adhesive nanocomposite may be electrically conducting ($>10^{-8}$ S/cm), thermally conducting ($>10^{-6}$ W/m-K), thermochromic (between 175 to 1000 K), gas barrier, fluorescent, magnetic, pigments, electrically insulating, thermally insulating, non-magnetic, transparent, white, UV absorbing ($>50\%$ absorption of UV-A and/or WV-B and/or WV-C), IR reflective ($>5\%$ infrared energy reflected), phosphor, hard and mar resistant, ductile, dielectric, current limiting, voltage limiting, abrasive, electrochemical, fragrant, flavorful, thermally sensitive, healing, bioactive, anti-microbial or combinations thereof.

Novolac phenolic resins require cures of 150-200° C. and high pressures (200-1000 kPa). Thus, the nanoparticles incorporated in the resin preferably should be such that they does not melt or degrade or decompose at temperatures below 200° C. and at pressures above 200 kPa. In certain embodiments, nanoparticles can be employed that do melt or decompose or phase transform during the curing process.

In certain adhesive embodiments, and particularly resole phenolic resin embodiments where water is produced as the adhesive and sealant cures, inorganic nanoparticles of cement forming compositions may be incorporated into the resin. In generic sense, any adhesive formulation (phenolic or non-phenolic) can benefit from such nanoparticles of cement forming compositions and the needed water for cementing action can be either provided or generated by the adhesive formulation, or alternatively supplied by moisture from air or medium or in any other suitable form. In certain embodiments, these cement forming adhesives act as a-sink for absorbing excess or undesirable water or fluids or blood, such as those present during dental care work.

Illustrations of cement forming nanomaterial compositions include calcium silicon oxides (wherein Ca:Si are respectively in 2:1, 3:2 and other ratios), calcium aluminum oxides, calcium aluminum silicon oxides, barium comprising silicon oxides, strontium comprising silicon oxides, calcium sulfoaluminate, gypsum, ettringite, tetracalcium aluminoferrite, magnesium phosphate, etc. and combinations thereof. These inorganic nanoparticles combine with water to form complexes, such as hydrates, and a hardened paste, where these particles form dense, bonded aggregations between the other crystalline phases, the resin, and the remaining unhydrated cementing particles; they also adhere to bonded surfaces and pieces of coarse aggregate, in some embodiments cementing everything together. The formation of this structure leads to an inorganic-resin nanocomposite, wherein the beneficial properties of the composite provide unusual structural, sealing, thermal, and/or other characteristics. The surprising properties achievable are in part the result of inorganic nanoparticles' cementing action and are responsible for setting, hardening, and strength development. Nanofibers, nanotubes, nanowhiskers, nanoplates, nanoflakes, nanolaminates and other nanoparticles with aspect ratio greater than one offer the opportunity to tailor unusual combinations of properties. Additionally, the nanoscale domain size allow the preparation of commercially useful thin films and layers to reduce weight and to reduce cost of the adhesive and sealant bond. This principle is applicable to any adhesive and sealant formulation (phenolic, acrylic, urethane, epoxies, starch-based, emulsion-based, solvent-based, hot-melt, etc.) whenever moisture or other reactive species are available for the setting, hardening, and strength development process. The specific amounts of water needed for such formulations to work well can be estimated from the hydration reaction stoichiometry (however, more or less water may be used to control or alter the performance). A few illustrative specifics include $$2\ Ca_3SiO_5 + 11\ H_2O \rightarrow 3CaO.2SiO_2.8H_2O + 3\ Ca(OH)_2$$

$$2\ Ca_2SiO_4 + 9\ H_2O \rightarrow 3CaO.2SiO_2.8H_2O + Ca(OH)_2$$

$$2\ Ca_3Al_2O_6 + 3\ CaSO_4.2H_2O + 26\ H_2O \rightarrow 6CaO.Al_2O_3.3SO_3.32H_2O$$

$$Ca_4Al_2Fe_2O_{10} + 10\ H_2O + 2\ Ca(OH)_2 \rightarrow 6CaO.Al_2O_3.12H_2O$$

In some embodiments, between 0.1% to 10% by weight (higher or lower levels may be employed) nanoparticles, in some embodiments between 3% to 7% by weight nanoparticles, are mixed into the phenolic resin before it is cured. This may be useful where improvements in structural and surface properties are desired with negligible modification of visual appearance. For structural properties, nanoparticles comprising simple or complex silicon oxides, aluminum oxides, zirconium oxides, titanium oxides, rare earth oxides, and combinations thereof may be utilized. Specific structural and surface properties that can modified by this technique include strength, hardness, stiffness, toughness, scratch resistance, thermal shock resistance, retained scratch resistance, wear resistance, acid etch resistance and chip resistance, and the like. In addition, with surface functionalized nanoparticles, controlled hydrophobicity, anti-slip, anti-microbial, UV-resistance, anti-mold, anti-fungal, low friction, low static charge, conductive and the like formulations may be achieved.

In other embodiments, between 8% to 30% (higher or lower levels may be employed) by weight nanoparticles, in some embodiments between 15% to 25% by weight nanoparticles, are mixed into the phenolic resin before it is cured. This may be useful where improvements in higher structural and surface properties are desired and where slight modification of visual appearance is acceptable. For structural properties, nanoparticles comprising simple or complex silicon oxides, aluminum oxides, zirconium oxides, titanium oxides, rare earth oxides, and combinations thereof may be used. Specific structural and surface properties that can modified by this technique include strength, hardness, stiffness, toughness, scratch resistance, thermal shock resistance, retained scratch resistance, wear resistance, acid etch resistance and chip resistance and the like. In addition, with surface functionalized nanoparticles, controlled hydrophobicity, anti-slip, anti-microbial, UV-resistance, anti-mold, anti-fungal, low friction, low static charge, conductive, and the like formulations are achieved.

In yet other embodiments, between 17% to 80% (higher or lower levels may be employed) by weight nanoparticles, in some embodiments between 40% to 60% by weight nanoparticles, are mixed into the phenolic resin before it is cured. This may be useful where improvements in structural and surface properties are desired and where some modification of visual appearance is acceptable. For structural properties, nanoparticles comprising simple or complex silicon oxides, aluminum oxides, zirconium oxides, titanium oxides, rare earth oxides, and combinations thereof may be used. Specific structural and surface properties that can modified by this technique include strength, hardness, stiffness, toughness, scratch resistance, thermal shock resistance, retained scratch resistance, wear resistance, acid etch resistance, chip resistance, and the like. In addition, with surface functionalized nanoparticles, controlled hydrophobicity, anti-slip, anti-microbial, UV-resistance, anti-mold, anti-fungal, low friction, low static charge, conductive, and the like formulations may be achieved.

In applications where short term fire resistance is needed, nanoparticles comprising antimony oxide, aluminum trihydrate, silicates, stannates, salts with high water of hydration, boron oxides, halides, and combinations thereof are preferably compounded in the the phenolic resin before it is cured. These nanoparticles suppress the propagation of flame species and radicals because of their high surface areas and ability to compound with these radicals; alternatively they release moisture which suppresses the propagation of the fire chemistry.

In applications where thermal or electrical conductivity is desired in the adhesive or sealant, nanoparticles of antimony doped tin oxide, indium tin oxide, other doped oxides, silver coated powders, gold coated powders, copper coated powders, precious metals, doped or undoped borides, doped or undoped nitrides, doped or undoped chalcogenides, doped or undoped carbides, sub-oxides of metals, elements (such as zinc, carbon, copper, tin), doped carbon, and combinations of these are preferably compounded in the phenolic resin before it is cured. Where lower loadings of nano-additives is desired for cost and/or performance reason, nanoparticles have an aspect ratio greater than 1, more preferably greater than 15, even more preferably greater than 150, most preferably greater than 1000. Such tubular, fibrous, rod-shaped, platelet-shaped, etc. nanoparticles with high aspect ratio provide a greater number and probability of contact points and percolate at a lower loading.

In applications where thermal or electrical insulation properties are desired in the adhesive or sealant, nanoparticles comprising insulators and dielectric materials are preferably compounded in the phenolic resin before it is cured. To illustrate, but not limit, aluminum oxide, zirconium oxide, rare earth oxides, titanium oxide, multi-metal titanium oxides, multi-metal silicon oxides, zinc oxides, and glasses are useful.

In applications where magnetic properties are desired in the adhesive or sealant, nanoparticles comprising iron oxide, copper iron oxide, zinc iron oxide, copper zinc iron oxide, nickel ferrite, cobalt ferrite, barium ferrite, strontium ferrite, iron garnets, iron spinels, other ferrites, rare earth ferrites, rare earth alloys of iron, rare earth alloys of nickel, rare earth alloys of cobalt, NdFeB, $SmCo_5$, metals, alloys, borides, carbides, oxyborides, boronitrides, nitrides, oxynitrides, other compounds comprising iron, nickel, cobalt, elements with magnetic moment, and combinations of these are preferably compounded in the phenolic resin before it is cured. Where lower loadings of nano-additives is desired for cost and/or performance reason, nanoparticles may have an aspect ratio greater than 1 and sometimes greater than 5.

In applications where color properties are desired, nanoparticles comprising inorganic color pigments (blue, yellow, red, pink, brown, black, white, violet, cyan, orange, green) are preferably compounded in the phenolic resin before it is cured. Organic dyes or wax nanoparticles can also be employed. In applications where transparency with or without a color is important, the nanoparticle should have an average particle size of less than 60 nanometers, preferably less than 40 nm, and more preferably less than 20 nm. At these sizes, the particle size is substantially smaller than the visible wavelengths of light (400-700 nm) and this leads to surprising exhibition of transparency in adhesives and sealants.

In applications where antimicrobial properties are desired, nanoparticles comprising Ag, Cu, Zn, Au, Pt, Pd, Ir, Ru, V, Ca, K, Na, Sn, Sb, Bi, rare earths, organic biocides, or alloys, compounds, or composites containing one or more of these elements are preferably compounded in the phenolic resin before it is cured. Such adhesives can enhance the life and reliability of the adhesives where they may otherwise be prone to rapid degradation due to the presence of moisture and microbial action. In other embodiments, the surface of these nanoparticles is functionalized, coated, or utilized to carry organics, genetic material, antigens, antibodies, diagnostic agents, disease prevention agents, markers, nutrients, or drugs in wound care and other health care applications. U.S. Pat. No. 6,228,904, which is hereby incorporated by reference in its entirety, teaches some suitable methods for functionalize nanoparticles in this manner. In certain embodiments, the nanoparticles comprise antimicrobials, pharmaceuticals, drug delivery vehicles, biologically active compositions of matter, nutrients and/or nutrient delivery vehicles, wound-care agents, wound-healing agents, thermally sensitive agents, sensors, and/or phase change compositions. In certain embodiments, the nanoparticles comprise perfumes, fragrances, cosmetic, caution-triggering odors, flavors, taste triggering agents, enzymes, and/or other bio-active substances.

Acrylic Resins:

In some embodiments, surface activated acrylic and cyanoacrylic resin adhesives are prepared by mixing nanomaterials (inorganic, metal, alloy, or polymer) to acrylic monomers such as methyl methacrylate and methacrylic acid with or without the addition of (a) cross linking agents such as dimethacrylates and/or (b) polymerization initiators such as peroxides (e.g. cumene hydroperoxide) and/or (c) catalysts such as toluidines and saccharin and/or (d) elastomers (e.g. rubbers, chlorosulfonated polyethylene). An illustration of rapid cure cyanoacrylate monomer is ethyl 2-cyanoacrylate. The nanomaterials mixed in may be, for example, single-metal or multi-metal oxides, carbides, borides, nitrides, elemental, metals, alloys, intermetallics, oxycarbides, oxynitrides, carbonitrides, chalcogenides, suicides, halides, phosphates, sulfates or carbonates. The nanoparticles may be electrically conducting (>$10^{-6}$ S/cm), thermally conducting (>$10^{-4}$ W/m-K), thermochromic (between 175 to 1000 K), gas barrier, fluorescent, magnetic, pigments, electrically insulating, thermally insulating, non-magnetic, transparent, white, UV absorbing (>50% absorption of UV-A and/or UV-B and/or UV-C), IR reflective (>5% infrared energy reflected), phosphor, hard (>2.5 mhos), ductile, dielectric, current limiting, voltage limiting, abrasive, electrochemical, or combinations thereof. In certain embodiments, the nanoparticles are antimicrobial, drug delivery vehicles, nutrients, wound-healing, thermally sensitive, sensors, and/or phase change compositions. In certain embodiments, the nanoparticles are spherical, fibrous, nanotubes, nanorods, nanoflakes, nanoplates, nanowhiskers, cones, laminated, hollow, dense, smooth, rough, dendrimers, core-shell, layered, non-uniform, gradient, and combinations thereof. The nanoparticle comprising adhesive so prepared offer properties that are in some or large part a function of the nanoparticles; to illustrate, the adhesive nanocomposite may be electrically conducting (>$10^{-8}$ S/cm), thermally conducting (>$10^{-6}$ W/m-K), thermochromic (between 175 to 1000 K), gas barrier, fluorescent, magnetic, pigments, electrically insulating, thermally insulating, non-magnetic, transparent, white, UV absorbing (>50% absorption of UV-A and/or UV-B and/or UV-C), IR reflective (>5% infrared energy reflected), phosphor, hard and mar resistant, ductile, dielectric, current limiting, voltage limiting, abrasive, electrochemical, fragrant, flavorful, thermally sensitive, healing, bioactive, anti-microbial, or combinations thereof.

In certain embodiments, the acrylic adhesives comprising nanoparticles are applied and used under controlled humidity environment given that atmospheric moisture can participate beneficially in the curing of the adhesive.

In some embodiments, between 0.1% to 10% (higher or lower levels may be employed) by weight nanoparticles, and in some embodiments, between 3% and 7% by weight nanoparticles, are mixed into the acrylic resin before it is cured. This may be useful where improvements in structural and surface properties are desired with negligible modification of visual appearance. For modification of structural properties, nanoparticles comprising simple or complex silicon oxides, aluminum oxides, zirconium oxides, titanium oxides, rare earth oxides, and combinations thereof may be used. Specific structural and surface properties that can modified by this technique include strength, hardness, stiffness, toughness, scratch resistance, thermal shock resistance, retained scratch resistance, wear resistance, acid etch resistance, chip resistance, and the like. In addition, with surface functionalized nanoparticles, hydrophobicity, anti-slip, anti-microbial, UV-resistance, anti-mold, anti-fungal, low friction, low static charge, conductive, and the like formulations are achieved.

In other embodiments, between 8% to 30% (higher or lower levels may be employed) by weight nanoparticles, and in some embodiments, between 15% to 25% by weight nanoparticles, are mixed into the acrylic resin before it is cured. This may be useful where improvements in higher structural and surface properties are desired and where slight modification of visual appearance is acceptable. For modification of structural properties, nanoparticles comprising simple or complex silicon oxides, aluminum oxides, zirconium oxides, titanium oxides, rare earth oxides, and combinations thereof are used. Specific structural and surface properties that can modified by this technique include strength, hardness, stiffness, toughness, scratch resistance, thermal shock resistance, retained scratch resistance, wear resistance, acid etch resistance and chip resistance and the like. In addition, with surface functionalized nanoparticles, hydrophobicity, anti-slip, anti-microbial, UV-resistance, anti-mold, anti-fungal, low friction, low static charge, conductive, and the like formulations are achieved.

In yet other embodiments, between 17% to 80% (higher or lower levels may be employed) by weight nanoparticles, and in some embodiments, between 40% to 60% by weight nanoparticles, are mixed into the acrylic resin before it is cured. This may be useful where improvements in structural and surface properties are desired and where some modification of visual appearance is acceptable. For modification of structural properties, nanoparticles comprising simple or complex silicon oxides, aluminum oxides, zirconium oxides, titanium oxides, rare earth oxides and combinations thereof are used. Specific structural and surface properties that can modified by this technique include strength, hardness, stiffness, toughness, scratch resistance, thermal shock resistance, retained scratch resistance, wear resistance, acid etch resistance and chip resistance and the like. In addition, with surface functionalized nanoparticles, hydrophobicity, anti-slip, anti-microbial, UV-resistance, anti-mold, anti-fungal, low friction, low static charge, conductive, and the like formulations are achieved.

In applications where short term fire resistance is needed, nanoparticles of antimony oxide, aluminum trihydrate, stannates, silicates, salts with high water of hydration, boron oxides, and halides are preferably compounded in the acrylic resin before it is cured. These nanoparticles suppress the propagation of flame species and radicals because of their high surface areas and ability to compound with these radicals; alternatively they release moisture which suppresses the propagation of the fire chemistry.

In applications where thermal or electrical conductivity is desired in the adhesive or sealant, nanoparticles of antimony doped tin oxide, indium tin oxide, other doped oxides, silver coated powders, gold coated powders, copper coated powders, precious metals, doped or undoped borides, doped or undoped nitrides, doped or undoped chalcogenides, doped or undoped carbides, sub-oxides of metals, elements (such as zinc, carbon, copper, tin), doped carbon, and combinations thereof are preferably compounded in the acrylic resin before it is cured. Where lower loadings of nano-additives are desired for cost and/or performance reasons, nanoparticles have an aspect ratio greater than 1, sometimes greater than 15, sometimes greater than 150, and sometimes greater than 1000. Such tubular, fibrous, rod-shaped, platelet-shaped, etc. nanoparticles with high aspect ratios provide a greater number and probability of contact points and percolate at a lower loading.

In applications where thermal or electrical insulation properties are desired in the adhesive or sealant, nanoparticles of insulators and dielectric are preferably compounded in the acrylic resin before it is cured. To illustrate, but not limit, aluminum oxide, zirconium oxide, rare earth oxides, titanium oxide, multi-metal titanium oxides, multi-metal silicon oxides, zinc oxides, and glasses may be used.

In applications where magnetic properties are desired in the adhesive or sealant, nanoparticles comprising iron oxide, copper iron oxide, zinc iron oxide, copper zinc iron oxide, nickel ferrite, cobalt ferrite, barium ferrite, strontium ferrite, iron garnets, iron spinels, other ferrites, rare earth ferrites, rare earth alloys of iron, rare earth alloys of nickel, rare earth alloys of cobalt, NdFeB, $SmCo_5$, metals, alloys, borides, carbides, oxyborides, boronitrides, nitrides, oxynitrides, other compounds comprising iron, nickel, cobalt, elements with magnetic moment, and combinations thereof are preferably compounded in the acrylic resin before it is cured. Where lower loadings of nano-additives is desired for cost and/or performance reasons, nanoparticles preferably have an aspect ratio greater than 1, sometimes greater than 5.

In applications where color properties are desired, nanoparticles of inorganic color pigments (blue, yellow, red, pink, brown, black, white, violet, cyan, orange, green) are preferably compounded in the acrylic resin before it is cured. Organic dyes or wax nanoparticles can also be employed. In applications, where transparency with or without a color is important, the nanoparticle should have an average particle size of less than 60 nanometers, preferably less than 40 nm and more preferably less than 20 nm. At these sizes, the particle size is substantially smaller than the visible wavelengths of light (400-700 mn), and this leads to surprising exhibition of transparency in adhesives and sealants.

In applications where antimicrobial properties are desired, nanoparticles comprising Ag, Cu, Zn, Au, Pt, Pd, Ir, Ru, V, Ca, K, Na, Sn, Sb, Bi, rare earths, organic biocides, or alloys or compounds or composites containing one or more of these elements are preferably compounded in the acrylic resin before it is cured. Such adhesives can enhance the life and reliability of adhesives where they may be prone to rapid degradation due to the presence of moisture and microbial action. In other embodiments, the surface of these nanoparticles are functionalized, coated, or utilized to carry organics, genetic material, antigens, antibodies, diagnostic agents, disease prevention agents, markers, nutrients or drugs in wound care and other health care applications. U.S. Pat. No. 6,228, 904, which is hereby incorporated by reference in its entirety, teaches some suitable methods of functionalizing nanoparticles in this manner. In certain embodiments, the nanoparticles comprise antimicrobial, pharmaceuticals and/or drug delivery vehicles, biologically active compositions of matter, nutrients and/or nutrient delivery vehicles, wound-care, wound-healing, thermally sensitive, sensors, and/or phase change compositions. In certain embodiments, the nanoparticles comprise perfumes, fragrances, cosmetic, caution-triggering odors, flavors, taste triggering agents, enzymes, and other bio-active substances.

The embodiments discussed for epoxy adhesives also apply in more complex adhesives such as (a) high temperature resistant adhesives derived from polyimide chemistry, Diels-Alder chemistry, and Michael addition chemistry (b) protein-based adhesives (c) starch-based adhesives (d) cellulosics, and (e) tackifying resins (e.g. rosin acids obtained from natural sources such as pine tree sap).

Urethane Adhesives:

In some embodiment, urethane adhesives are prepared by mixing nanomaterials (inorganic, metal, alloy, polymer, etc.) to diisocyanates and/or diols such as polyethers with or without the addition of (a) catalysts such as metal octoates/soaps and/or (b) viscosity modifiers. The nanomaterials mixed in may be single-metal or multi-metal oxides, carbides, borides, nitrides, elemental, metals, alloys, intermetallics, oxycarbides, oxynitrides, carbonitrides, chalcogenides, silicides, halides, phosphates, sulfates or carbonates. The nanoparticles may be electrically conducting ($>10^{-6}$ S/cm), thermally conducting ($>10^{-4}$ W/m-K), thermochromic (between 175 to 1000 K), gas barrier, fluorescent, magnetic, pigments, electrically insulating, thermally insulating, non-magnetic, transparent, white, UV absorbing (>50% absorption of UV-A and/or UV-B and/or UV-C), IR reflective (>5% infrared energy reflected), phosphor, hard (>2.5 mhos), ductile, dielectric, current limiting, voltage limiting, abrasive, electrochemical, or combinations thereof. In certain embodiments, the nanoparticles are antimicrobial, drug delivery vehicle, nutrient, wound-healing, thermally sensitive, sensors, and/or phase change compositions. In certain embodiments, the nanoparticles are spherical, fibrous, nanotubes, nanorods, nanoflakes, nanoplates, nanowhiskers, cones, laminated, hollow, dense, smooth, rough, dendrimers, core-shell, layered, non-uniform, gradient, and combinations thereof. The adhesive comprising nanoparticles so prepared may offer properties that are in some or large part a function of the nanoparticles; to illustrate, the adhesive nanocomposite may be electrically conducting ($>10^{-8}$ S/cm), thermally conducting ($>10^{-6}$ W/m-K), thermochromic (between 175 to 1000 K), gas arrier, fluorescent, magnetic, pigments, electrically insulating, thermally insulating, non-magnetic, transparent, white, UV absorbing (>50% absorption of UV-A and/or UV-B and/or UV-C), IR reflective (>5% infrared energy reflected), phosphor, hard and mar resistant, ductile, dielectric, current limiting, voltage limiting, abrasive, electrochemical, fragrant, flavorful, thermally sensitive, healing, bioactive, anti-microbial or combinations thereof.

In certain embodiments, the urethane adhesives comprising nanoparticles are applied and used under controlled humidity environment given that atmospheric moisture can participate in the curing of the adhesive.

In some embodiments, between 0.1% to 10% (higher or lower levels may be employed) by weight nanoparticles, and in some embodiments, between 3% to 7% by weight nanoparticles, are mixed with the thermoplastic before it is cured. This may be useful where improvements in structural and surface properties are desired with negligible modification of visual appearance. For modification of structural properties, nanoparticles comprising simple or complex silicon oxides, aluminum oxides, zirconium oxides, titanium oxides, rare earth oxides and combinations thereof are used. Specific structural and surface properties that can modified by this technique include strength, hardness, stiffness, toughness, scratch resistance, thermal shock resistance, retained scratch resistance, wear resistance, acid etch resistance, chip resistance, and the like. In addition, with surface functionalized nanoparticles, hydrophobicity, anti-slip, anti-microbial, UV-resistance, anti-mold, anti-fungal, low friction, low static charge, conductive, and the like formulations may be achieved.

In other embodiments, between 8% to 30% (higher or lower levels may be employed) by weight nanoparticles, and in some embodiments, between 15% to 25% by weight nanoparticles, are mixed with the thermoplastic before it is cured. This may be useful where improvements in higher structural and surface properties are desired and where slight modification of visual appearance is acceptable. For structural properties, nanoparticles comprising simple or complex silicon oxides, aluminum oxides, zirconium oxides, titanium oxides, rare earth oxides and combinations thereof may be used. Specific structural and surface properties that can modified by this technique include strength, hardness, stiffness, toughness, scratch resistance, thermal shock resistance, retained scratch resistance, wear resistance, acid etch resistance, chip resistance, and the like. In addition, with surface functionalized nanoparticles, hydrophobicity, anti-slip, anti-microbial, UV-resistance, anti-mold, anti-fungal, low friction, low static charge, conductive, and the like formulations are achieved.

In yet other embodiments, between 17% to 80% (higher or lower levels may be employed) by weight nanoparticles, and in some embodiments, between 30% to 60% by weight nanoparticles, are mixed with the thermoplastic before it is cured. This may be useful where improvements in structural and surface properties are desired and where some modification of visual appearance is acceptable. For structural properties, nanoparticles comprising simple or complex silicon oxides, aluminum oxides, zirconium oxides, titanium oxides, rare earth oxides, and combinations thereof may be used. Specific structural and surface properties that can modified by this technique include strength, hardness, stiffness, toughness, scratch resistance, thermal shock resistance, retained scratch resistance, wear resistance, acid etch resistance, chip resistance and the like. In addition, with surface fuctionalized nanoparticles, hydrophobicity, anti-slip, anti-microbial, UV-resistance, anti-mold, anti-fungal, low friction, low static charge, conductive and the like formulations are achieved.

In applications where short term fire resistance is needed, nanoparticles of antimony oxide, aluminum trihydrate, silicates, salts with high water of hydration, boron oxides, and halides are preferably compounded in the isocyanates and/or diols before they are reacted. These nanoparticles suppress the propagation of flame species and radicals because of their high surface areas and ability to compound with these radicals; alternatively they release moisture which suppresses the propagation of the fire chemistry.

In applications where thermal or electrical conductivity is desired in the adhesive or sealant, nanoparticles of antimony doped tin oxide, indium tin oxide, other doped oxides, silver coated powders, gold coated powders, copper coated powders, precious metals, doped or undoped borides, doped or undoped nitrides, doped or undoped chalcogenides, doped or undoped carbides, sub-oxides of metals, elements (such as zinc, carbon, copper, tin), doped carbon, and combinations thereof are preferably compounded in the isocyanates and/or diols before they are cured. Where lower loadings of nano-additives are desired for cost and/or performance reason, nanoparticles have an aspect ratio greater than 1, sometimes greater than 15, even more preferably greater than 150, most preferably greater than 1000. Such tubular, fibrous, rod-shaped, platelet-shaped, etc. nanoparticles with high aspect ratios provide a greater number and probability of contact points and percolate at a lower loading.

In applications where thermal or electrical insulation properties are desired in the adhesive or sealant, nanoparticles of insulator and dielectric materials are preferably compounded in the isocyanates and/or diols before they are cured. To illustrate, but not limit, aluminum oxide, zirconium oxide, rare earth oxides, titanium oxide, multi-metal titanium oxides, multi-metal silicon oxides, zinc oxides, glasses, may be used.

In applications where magnetic properties are desired in the adhesive or sealant, nanoparticles of iron oxide, copper iron oxide, zinc iron oxide, copper zinc iron oxide, nickel ferrite, cobalt ferrite, barium ferrite, strontium ferrite, iron garnets, iron spinels, other ferrites, rare earth ferrites, rare earth alloys of iron, rare earth alloys of nickel, rare earth alloys of cobalt, NdFeB, $SmCo_5$, metals, alloys, borides, carbides, oxyborides, boronitrides, nitrides, oxynitrides, other compounds comprising iron, nickel, cobalt or elements with magnetic moment and combinations of these are preferably compounded in the isocyanates and/or diols before they are cured. Where lower loadings of nano-additives are desired for cost and/or performance reasons, nanoparticles may have an aspect ratio greater than 1, sometimes greater than 5.

In applications where color properties are desired, nanoparticles of inorganic color pigments (blue, yellow, red, pink, brown, black, white, violet, cyan, orange, green) are preferably compounded in the isocyanates and/or diols before they are cured. Organic dyes or wax nanoparticles may also be employed. In applications, where transparency with or without a color is important, the nanoparticle should have an average particle size of less than 60 nanometers, preferably less than 40 nm and more preferably less than 20 nm. At these sizes, the particle size is substantially smaller than the visible wavelengths of light (400-700 nm) and this leads to surprising exhibition of transparency in adhesives and sealants.

In applications where antimicrobial properties are desired, nanoparticles comprising Ag, Cu, Zn, Au, Pt, Pd, Ir, Ru, V, Ca, K, Na, Sn, Sb, Bi, rare earths, organic biocides, or alloys or compounds or composites containing one or more of these elements are preferably compounded in the isocyanates and/or diols before they are cured. Such adhesives may have enhanced life and reliability where they would otherwise be prone to rapid degradation due to the presence of moisture and microbial action. In other embodiments, the surface of these nanoparticles is functionalized, coated, or utilized to carry organics, genetic material, antigens, antibodies, diagnostic agents, disease prevention agents, markers, nutrients or drugs in wound care and other health care applications. U.S. Pat. No. 6,228,904, which is hereby incorporated by reference in its entirety, teaches some suitable methods for functionalizing nanoparticles in this manner. In certain embodiments, the nanoparticles comprise antimicrobial, pharmaceuticals and/or drug delivery vehicles, biologically active compositions of matter, nutrients and/or nutrient delivery vehicles, wound-care, wound-healing, thermally sensitive, sensors, and/or phase change compositions. In certain embodiments, the nanoparticles comprise perfumes, fragrances, cosmetic, caution-triggering odors, flavors, taste triggering agents, enzymes, and other bio-active substances.

The embodiments discussed for urethane adhesives also apply to pressure sensitive adhesives as well. Such adhesives are useful in adhesive tapes for numerous applications (masking, medical, electrical, packaging, marking, etc).

Hot-Melt Adhesives:

In some embodiment, hot-melt adhesives are prepared by mixing nanoparticles (inorganic, metal, alloy, or polymer) with thermoplastic materials, such as but not limited, to waxes, acetates, phenoxy resins, polypropylene, butadiene copolymers, acrylate copolymers, polyesters, polyamides, and polyurethanes. Plasticizers and tackifying agents may be added in certain embodiments. The nanoparticles mixed in may be single-metal or multi-metal oxides, carbides, borides, nitrides, elemental, metals, alloys, intermetallics, oxycarbides, oxynitrides, carbonitrides, chalcogenides, silicides, halides, phosphates, sulfates, or carbonates. The nanoparticles may be electrically conducting ($>10^{-6}$ S/cm), thermally conducting ($>10^{-4}$ W/m-K), thermochromic (between 175 to 1000 K), gas barrier, fluorescent, magnetic, pigments, electrically insulating, thermally insulating, non-magnetic, transparent, white, UV absorbing (>50% absorption of UV-A and/or UV-B and/or UV-C), IR reflective (>5% infrared energy reflected), phosphor, hard (>2.5 mhos), ductile, dielectric, current limiting, voltage limiting, abrasive, electrochemical, or combinations thereof. In certain embodiments, the nanoparticles are antimicrobial, drug delivery vehicles, nutrient, wound-healing, thermally sensitive, sensors, and/or phase change compositions. In certain embodiments, the nanoparticles are spherical, fibrous, nanotubes, nanorods, nanoflakes, nanoplates, nanowhiskers, cones, laminated, hollow, dense, smooth, rough, dendrimers, core-shell, layered, non-uniform, gradient, and combinations thereof. The nanoparticle comprising adhesive so prepared offer properties that are in some or large part a function of the nanoparticles; to illustrate, the adhesive nanocomposite may be electrically conducting ($>10^{-8}$ S/cm), thermally conducting ($>10^{-6}$ W/m-K), thermochromic (between 175 to 1000 K), gas barrier, fluorescent, magnetic, pigments, electrically insulating, thermally insulating, non-magnetic, transparent, white, UV absorbing (>50% absorption of UV-A and/or UV-B and/or UV-C), IR reflective (>5% infrared energy reflected), phosphor, hard and mar resistant, ductile, dielectric, current limiting, voltage limiting, abrasive, electrochemical, fragrant, flavorful, thermally sensitive, healing, bioactive, anti-microbial or combinations thereof.

In certain embodiments, the hot-melt adhesives comprising nanoparticles are applied and used under controlled humidity environment given that atmospheric moisture can participate in the curing of the adhesive.

In some embodiments, between 0.1% to 10% (higher or lower levels may be employed) by weight nanoparticles, and in some embodiments, between 3% to 6% by weight nanoparticles, are mixed with the thermoplastic before it is cured. This may be useful where improvements in structural and surface properties are desired with negligible modification of visual appearance. For structural properties, nanoparticles comprising simple or complex silicon oxides, aluminum oxides, zirconium oxides, titanium oxides, rare earth oxides, and combinations thereof may be used. Specific structural and surface properties that can modified by this technique include strength, hardness, stiffness, toughness, scratch resistance, thermal shock resistance, retained scratch resistance, wear resistance, acid etch resistance, chip resistance, and the like. In addition, with surface functionalized nanoparticles, hydrophobicity, anti-slip, anti-microbial, UV-resistance, anti-mold, anti-fungal, low friction, low static charge, conductive, and the like formulations are achieved.

In other embodiments, between 8% to 30% (higher or lower levels may be employed) by weight nanoparticles, and in some embodiments, between 15% to 25% by weight nanoparticles, are mixed with the thermoplastic before it is cured. This may be useful where improvements in higher structural and surface properties are desired and where slight modification of visual appearance is acceptable. For structural properties, nanoparticles comprising simple or complex silicon oxides, aluminum oxides, zirconium oxides, titanium oxides, rare earth oxides, and combinations thereof may be used. Specific structural and surface properties that can modified by this technique include strength, hardness, stiffness, toughness, scratch resistance, thermal shock resistance, retained scratch resistance, wear resistance, acid etch resistance, chip resistance and the like. In addition, with surface functionalized nanoparticles, hydrophobicity, anti-slip, anti-microbial, UV-resistance, anti-mold, anti-fungal, low friction, low static charge, conductive, and the like formulations may be achieved.

In yet other embodiments, between 17% to 80% (higher or lower levels may be employed) by weight nanoparticles, in some embodiments between 30% to 60% by weight nanoparticles, are mixed with the thermoplastic before it is cured/set. This may be useful where improvements in structural and surface properties are desired and where some modification of visual appearance is acceptable. For structural properties, nanoparticles comprising simple or complex silicon oxides, aluminum oxides, zirconium oxides, titanium oxides, rare earth oxides, and combinations thereof may be used. Specific structural and surface properties that can modified by this technique include strength, hardness, stiffness, toughness, scratch resistance, thermal shock resistance, retained scratch resistance, wear resistance, acid etch resistance, chip resistance, and the like. In addition, with surface functionalized nanoparticles, hydrophobicity, anti-slip, anti-microbial, UV-resistance, anti-mold, anti-fungal, low friction, low static charge, conductive, and the like formulations may be achieved.

In applications where short term fire resistance is needed, nanoparticles of antimony oxide, aluminum trihydrate, stannates, silicates, salts with high water of hydration, boron oxides, and halides are preferably compounded in the thermoplastic before it is reacted. These nanoparticles suppress the propagation of flame species and radicals because of their high surface areas and ability to compound with these radicals; alternatively they release moisture which suppresses the propagation of the fire chemistry.

In applications where thermal or electrical conductivity is desired in the adhesive or sealant, nanoparticles comprising antimony doped tin oxide, indium tin oxide, other doped oxides, silver coated powders, gold coated powders, copper coated powders, precious metals, doped or undoped borides, doped or undoped nitrides, doped or undoped chalcogenides, doped or undoped carbides, sub-oxides of metals, elements (such as zinc, carbon, copper, tin), doped carbon, and combinations thereof are preferably compounded in the thermoplastic before it is cured. Where lower loadings of nano-additives are desired for cost and/or performance reasons, the nanoparticles preferably have an aspect ratio greater than 1, sometimes greater than 15, sometimes greater than 150, sometimes greater than 1000. Such tubular, fibrous, rod-shaped, platelet-shaped, etc. nanoparticles with high aspect ratios provide a greater number and probability of contact points and percolate at a lower loading.

In applications where thermal or electrical insulation properties are desired in the adhesive or sealant, nanoparticles comprising insulators and dielectric are preferably compounded with the thermoplastic. To illustrate but not limit, aluminum oxide, zirconium oxide, rare earth oxides, titanium oxide, multi-metal titanium oxides, multi-metal silicon oxides, zinc oxides, and glasses are useful.

In applications where magnetic properties are desired in the adhesive or sealant, nanoparticles comprising iron oxide, copper iron oxide, zinc iron oxide, copper zinc iron oxide, nickel ferrite, cobalt ferrite, barium ferrite, strontium ferrite, iron garnets, iron spinels, other ferrites, rare earth ferrites, rare earth alloys of iron, rare earth alloys of nickel, rare earth alloys of cobalt, NdFeB, $SmCo_5$, metals, alloys, borides, carbides, oxyborides, boronitrides, nitrides, oxynitrides, other compounds comprising iron, nickel, cobalt or elements with magnetic moment and combinations of these are preferably compounded with the thermoplastic. Where lower loadings of nano-additives are desired for cost and/or performance reason, the nanoparticles preferably have an aspect ratio greater than 1 and sometimes greater than 5.

In applications where color properties are desired, nanoparticles of inorganic color pigments (blue, yellow, red, pink, brown, black, white, violet, cyan, orange, green) are preferably compounded with the thermoplastic. Organic dyes or wax nanoparticles can also be employed. In applications, where transparency with or without a color is important, the nanoparticles should preferably have an average particle size of less than 60 nanometers, preferably less than 40 nm, and more preferably less than 20 nm. At these sizes, the particle size is substantially smaller than the visible wavelengths of light (400-700 nm), and this leads to surprising exhibition of transparency in adhesives and sealants.

In applications where antimicrobial properties are desired, nanoparticles comprising Ag, Cu, Zn, Au, Pt, Pd, Ir, Ru, V, Ca, K, Na, Sn, Sb, Bi, rare earths, organic biocides, or alloys, compounds, or composites containing one or more of these elements are preferably compounded with the thermoplastic. Such adhesives may have enhanced life and reliability where they may otherwise be prone to rapid degradation due to the presence of moisture and microbial action. In other embodiments, the surface of these nanoparticles is functionalized, coated, or utilized to carry organics, genetic material, antigens, antibodies, diagnostic agents, disease prevention agents, markers, nutrients or drugs in wound care and other health care applications. U.S. Pat. No. 6,228,904, which is hereby incorporated by reference in its entirety, teaches some suitable methods of functionalizing nanoparticles in this manner. In certain embodiments, the nanoparticles comprise antimicrobial, pharmaceuticals and/or drug delivery vehicles, biologically active compositions of matter, nutrients and/or nutrient delivery vehicles, wound-care, wound-healing, thermally sensitive, sensors, and/or phase change compositions. In certain embodiments, the nanoparticles comprise perfumes, fragrances, cosmetic, caution-triggering odors, flavors, taste triggering agents, enzymes, and other bio-active substances.

The embodiments discussed for hot-melt adhesives also apply to solvent-based, elastomer-based and emulsion-based adhesives as well.

Ceramic Cements:

In some embodiment, ceramic cement adhesives are prepared by mixing nanoparticles (inorganic, metal, alloy, or polymer) to a ceramic mixture, such as, but not limited to, zircon, silica, alumina, zirconia, mullite, clay, and minerals. In certain embodiments, these high temperature use adhesive formulations (by high temperature, it is meant above 200° C., preferably above 400° C., more preferably above 700° C., and most preferably above 1000° C.) may be phosphate bonded. In other embodiments, these high temperature use adhesive formulations may be aluminate-binder or silicate-binder bonded. In yet other embodiments, these high temperature use adhesive formulations may be oxysulfate bonded. The ceramic mixture may itself comprise nanoparticles or submicron particles. High purity ceramics are useful for these formulations. The nanoparticles mixed in to enhance the performance of ceramic cements may be single-metal or multi-metal oxides, carbides, borides, nitrides, elemental, metals, alloys, intermetallics, oxycarbides, oxynitrides, carbonitrides, chalcogenides, silicides, halides, phosphates, sulfates or carbonates. The nanoparticles may be electrically conducting ($>10^{-6}$ S/cm), thermally conducting ($>10^{-4}$ W/m-K), thermochromic (between 175 to 1000 K), gas barrier, fluorescent, magnetic, pigments, electrically insulating, thermally insulating, non-magnetic, transparent, white, UV absorbing (>50% absorption of UV-A and/or UV-B and/or WV-C), IR reflective (>5% infrared energy reflected), phosphor, hard (>2.5 mhos), ductile, dielectric, current limiting, voltage limiting, abrasive, electrochemical, or combinations thereof. In certain embodiments, the nanoparticles are anti-microbial, drug delivery vehicles, nutrients, wound-healing, thermally sensitive, sensors, and/or phase change compositions. In certain embodiments, the nanoparticles are spherical, fibrous, nanotubes, nanorods, nanoflakes, nanoplates, nanowhiskers, cones, laminated, hollow, dense, smooth, rough, dendrimers, core-shell, layered, non-uniform, gradient, and combinations thereof. The nanoparticle comprising adhesive so prepared offer properties that are in some or large part a function of the nanoparticles; to illustrate, the adhesive nanocomposite may be electrically conducting ($>10^{-8}$ S/cm), thermally conducting ($>10^{-6}$ W/m-K), thermochromic (between 175 to 1000 K), gas barrier, fluorescent, magnetic, pigments, electrically insulating, thermally insulating, non-magnetic, transparent, white, Uw absorbing (>50% absorption of Lw-A and/or Lw-B and/or Lw-C), IR reflective (>5% infrared energy reflected), phosphor, hard and mar resistant, ductile, dielectric, current limiting, voltage limiting, abrasive, electrochemical, fragrant, flavorful, thermally sensitive, healing, bioactive, anti-microbial or combinations thereof.

In certain embodiments, the ceramic cement adhesives comprising nanoparticles are applied and used under controlled humidity environment given that atmospheric moisture can participate in the potting, bonding, casting and/or curing of the adhesive.

In certain embodiments, between 1% to 95% (higher or lower levels may be employed) by weight nanoparticles, and in some embodiments between 40% to 60% by weight nanoparticles, are mixed with the ceramic cement formulation before it is applied and cured. Specific structural and surface properties that can modified by this technique include strength, hardness, stiffness, toughness, scratch resistance, thermal conductivity, electrical and magnetic properties, electrical breakdown conditions, thermal shock resistance, retained scratch resistance, wear resistance, acid etch resistance and chip resistance and the like. In addition, with surface functionalized nanoparticles, hydrophobicity, anti-slip, anti-microbial, Lw-resistance, anti-mold, anti-fungal, low friction, low static charge, conductive, and the like formulations may be achieved.

One of the several benefits of nanoparticle-based nanotechnology to cement adhesives is the high surface area and surface reactivity of nanoparticles. This can address one of the current limitations of ceramic cements—slow cure rate. Ceramic cements comprising nanoparticles offer cure rates that are, in some embodiments, at least 25% faster than those ceramic cements wherein the constituents of the formulation are 1 micron or more in size. In some embodiments, ceramic cements comprising nanoparticles can cure in less than 12 hours. For faster curing rates, non-limiting illustrations of cure-accelerating nanomaterial compositions include calcium silicon oxides (wherein Ca:Si are respectively in 2:1, 3:2, and other ratios), calcium aluminum oxides, calcium aluminum silicon oxides, silicon oxides comprising barium, silicon oxides comprising strontium, calcium sulfoaluminate, gypsum, ettringite, tetracalcium aluminoferrite, magnesium phosphate, and combinations thereof. These inorganic nanoparticles combine with water to form complexes, such as hydrates, and a hardened paste, where these particles form dense, bonded aggregations between the other crystalline phases, the resin, and the remaining unhydrated cementing particles; they also adhere to bonded surfaces and pieces of coarse aggregate, cementing everything together. The formation of this structure leads to a nanocomposite, wherein the beneficial properties of the composite provide unusual structural, sealing, thermal and other characteristics. The surprising properties achievable are in part the result of inorganic nanoparticles' cementing action and is responsible for setting, hardening, and strength development. Nanofibers, nanotubes, nanowhiskers, nanoplates, nanoflakes, nanolaminates and other nanoparticles with aspect ratio greater than one offer the opportunity to tailor unusual combination of properties. Additionally, the nanoscale domain size allow the preparation of commercially useful thin films and layers to reduce weight and to reduce cost of the adhesive and sealant bond.

In applications where thermal or electrical conductivity is desired in the adhesive or sealant, nanoparticles of antimony doped tin oxide, indium tin oxide, other doped oxides, silver coated powders, gold coated powders, copper coated powders, precious metals, doped or undoped borides, doped or undoped nitrides, doped or undoped chalcogenides, doped or undoped carbides, sub-oxides of metals, elements (such as zinc, carbon, copper, tin), doped carbon and combinations thereof are preferably compounded in the ceramic cement.

Where lower loadings of nano-additives are desired for cost and/or performance reasons, the nanoparticles preferably have an aspect ratio greater than 1, sometimes greater than 15, sometimes greater than 150, and sometimes greater than 1000. Such tubular, fibrous, rod-shaped, platelet-shaped, etc. nanoparticles with high aspect ratios provide a greater number and probability of contact points and percolate at a lower loading.

In applications where thermal or electrical insulation properties are desired in the adhesive or sealant, nanoparticles comprising insulator and dielectric materials are preferably compounded with the ceramic cement. To illustrate, but not limit, aluminum oxide, zirconium oxide, rare earth oxides, titanium oxide, multi-metal titanium oxides, multi-metal silicon oxides, zinc oxides, and glasses may be useful.

In applications where magnetic properties are desired in the adhesive or sealant, nanoparticles of iron oxide, copper iron oxide, zinc iron oxide, copper zinc iron oxide, nickel ferrite, cobalt ferrite, barium ferrite, strontium ferrite, iron garnets, iron spinels, other ferrites, rare earth ferrites, rare earth alloys of iron, rare earth alloys of nickel, rare earth alloys of cobalt, NdFeB, $SmCo_5$, metals, alloys, borides, carbides, oxyborides, boronitrides, nitrides, oxynitrides, other compounds comprising iron, nickel, cobalt or elements with magnetic moment, and combinations thereof are preferably compounded with the ceramic cement. Where lower loadings of nano-additives are desired for cost and/or performance reasons, the nanoparticles may have an aspect ratio greater than 1 and sometimes greater than 5.

In applications where color properties are desired, nanoparticles of inorganic color pigments (blue, yellow, red, pink, brown, black, white, violet, cyan, orange, green) may be compounded with the ceramic cement. In applications where transparency with or without a color is important, the nanoparticle should have an average particle size of less than 60 nanometers, preferably less than 40 nm, and more preferably less than 20 nm. At these sizes, the particle size is substantially smaller than the visible wavelengths of light (400-700 nm) and this leads to surprising exhibition of transparency in adhesives and sealants.

In applications where antimicrobial properties are desired, nanoparticles comprising Ag, Cu, Zn, Au, Pt, Pd, Ir, Ru, V, Ca, K, Na, Sn, Sb, Bi, rare earths, organic biocides, or alloys, compounds, or composites containing one or more of these elements are preferably compounded with the ceramic cement. Such adhesives may have enhanced life and reliability where they would otherwise prone to rapid degradation due to the presence of moisture and microbial action. In other embodiments, the surface of these nanoparticles is functionalized, coated, or utilized to carry organics, genetic material, antigens, antibodies, diagnostic agents, disease prevention agents, markers, nutrients, or drugs in wound care and other health care applications using techniques, such as those taught in U.S. Pat. No. 6,228,904, which is hereby incorporated by reference in its entirety. In certain embodiments, the nanoparticles comprise antimicrobial, pharmaceuticals and/or drug delivery vehicles, biologically active compositions of matter, nutrient and/or nutrient delivery vehicles, wound-care, wound-healing, thermally sensitive, sensors, and/or phase change compositions. In certain embodiments, the nanoparticles comprise perfumes, fragrances, cosmetic, caution-triggering odors, flavors, taste triggering agents, enzymes, and other bio-active substances.

In applications where controlled and fine polishing is desired, nanoparticles of abrasives (carbides, borides, nitrides, diamonds, ceria, zirconia, alumina, corundum, silicates, etc.) may be compounded with an adhesive resin or ceramic cement. These may then be formed into polishing pads, films, scrubs and the like.

Applications of Nanoparticles and Submicron Powders Comprising Adhesive and Sealants Adhesives and sealants comprising nanoparticles offer applications in the manufacture and installation of Construction and buildings—Laminated wood panels, beams, wall panels, installation of flooring, tile, carpeting, ceiling panels and wall coverings.

Consumer goods—Manufacture of office supplies, tapes, hobby and model supplies, and paper products.

Nonrigid bonding—Bonding of woven and non-woven fabrics; athletic shoes, rugs, filters, books, and sporting goods.

Packaging—Manufacture of cartons, boxes and corrugated products; bags, envelops, disposable products (diapers, paper products); cartons; and labels and stamps.

Rigid bonding—Manufacture of appliances, electronics, household products and furniture.

Tapes—Manufacture of all tapes, including those used for surgery, packaging, industrial applications, consumer applications and masking applications.

Transportation—Aircraft and aerospace structural assemblies; automotive, truck, boat, and bus assembly; mobile home manufacturing.

Adhesives and sealants comprising nanoparticles also offer opportunities in process simplification and cost reduction. For example, they can reduce or eliminate the need for staples, screws, rivets, clips, nails, snaps or stitching.

Ceramic cements (inorganic adhesives) comprising nanoparticles offer opportunities in speeding up the processing curing given their surface areas as discussed herein. Ceramic adhesives and sealants comprising nanoparticles are useful for heaters, radiators, igniters, circuit breakers, sensors, high temperature filters, lamp assembly, resistors, furnace repair, thermocouples, insulators, etc. They are also useful for the assembly or repair of any product operating at temperatures above 200° C., preferably above 500° C. In other embodiments, ceramic cements comprising nanoscale powder are useful for the assembly or repair of any product requiring corrosion resistance, electrical resistance, and/or thermal resistance. In certain special applications, microbial resistance or self-cleaning properties can be achieved by incorporating compositions, such as silver and photoactive metal oxides respectively.

In some embodiments, the nanomaterial filled adhesive is first near net shaped and then can be processed in an additional step to produce porous or dense part. In other embodiments, nanomaterial filled adhesive is first applied as a film or coating and then can be processed (e.g. thermally) in an additional step to produce a finished component such as a bar code label or antenna or security label.

Examples 1-2

Calcium Silicon Oxide Powders

Calcium octoate precursor was mixed with Octamethyl cyclotetrasiloxane (OMCT) (0.05:0.95::Ca:Si ratio). This mix was sprayed into a thermal plasma reactor described above at a rate of about 50 ml/min using about 100 standard liters per minute oxygen. The peak vapor temperature in the thermal plasma reactor, processed at velocities greater than 0.25 mach, was above 3000 K. The vapor was cooled and then quenched by Joule-Thompson expansion. The powders collected were analyzed using X-ray diffraction and a surface area analyzer. It was discovered that the powders were amorphous and had a specific surface area of greater than 100 m²/gm (equivalent average particle size less than 100 nanometers).

In another step, zirconium octoate precursor was mixed with Octamethyl cyclotetrasiloxane (OMCT) (0.05:0.95::Zr: Si ratio). This mix was sprayed into a thermal plasma reactor described above at a rate of about 50 ml/min using about 100 standard liters per minute oxygen. The peak vapor temperature in the thermal plasma reactor, processed at velocities greater than 0.25 mach, was above 3000 K. The vapor was cooled and then quenched by Joule-Thompson expansion. The powders collected were analyzed using X-ray diffraction and surface area analyzer. It was discovered that the powders were amorphous and had a specific surface area of greater than 100 m²/gm (equivalent particle size less than 100 nanometers).

Both silicate powders were mixed with water. With calcium silicon oxide, an immediate thickening and setting process began, and in less than 30 minutes, a thick solidified paste formation was seen. However, no such thickening and setting process was seen with zirconium silicon oxide. This example show that nanoparticles comprising calcium silicon oxides can be prepared and that these nanoparticles offer cementing characteristics.

Examples 3

Calcium Aluminum Oxide Powders

Calcium octoate precursor was mixed with aluminum octoate precursor such that the metal content of Ca:Al were in 1:2 molar ratios. The mix was diluted with hexane till the viscosity of the precursor was less than 100 cP. This mix was srayed into a thermal plasma reactor described above at a rate of about 60 ml/min using about 120 standard liters per minute oxygen. The peak vapor temperature in the thermal plasma reactor, processed at velocities greater than 0.25 mach, was above 3000 K. The vapor was cooled and then quenched by Joule-Thompson expansion. The powders collected were analyzed using X-ray diffraction (Warren-Averbach analysis) and surface area analyzer. It was discovered that the powders had a crystallite size of less than 100 nm and a specific surface area of greater than 20 m²/gm. The powder matched the expected diffraction peaks for calcium aluminum oxide.

This example confirms that nanomaterials of cementing compositions can be successfully prepared using the teachings herein.

Examples 4

Aluminum Oxide Comprising Adhesive/Sealant Nanocomposite 225 mg of aluminum oxide nanoparticles (average crystallite size less than 20 nanometers) were mixed with 525 mg of UV curable adhesive/sealant resin as follows:

place nanoscale material on a mixing sheet and weigh the nanoscale material added;

place adhesive resin on the sheet next to the powder and weigh;

lap, mead and mix the nanoscale material and resin with a spatula to achieve a good consistency formulation;

place the mixture between two transparent surfaces;

cure the mixture using the UV gun;

test the coupon visually for consistency; and perform tests for properties.

750 grams of uniform adhesive/sealant nanocomposite resulted from this effort.

Example 5

Adhesive Comprising Aluminum Silicon Oxide Nanoparticles 225 mg of aluminum silicon oxide (55 wt % $Al_2O_3$-45 wt % $SiO_2$) nanoparticles (average crystallite size less than 20 nanometers) were mixed with 525 mg of UV curable adhesive/sealant resin as in Example 4. An optically clear 750 grams of uniform adhesive/sealant nanocomposite resulted from this effort. This example shows that inorganic nanoparticles can be incorporated into organic adhesives and sealants without modifying their visual appearance.

Example 6-9

Adhesive Comprising Barium Zirconium Oxide Nanoparticles

Varying amounts of barium zirconium oxide (50 at % BaO-50 at % $ZrO_2$) nanoparticles (average crystallite size less than 50 nanometers) were mixed with UV curable adhesive/sealant resin as in Example 4. The hardness of the adhesive/sealant nanocomposite was measured using Vickers microindentor. For comparison, a sample was prepared without nanoparticles to assess the benefits of nanoparticles. The observed data is presented below in Table 1.

TABLE 1

| Sample | | Hardness, kgf/mm2 |
|---|---|---|
| Example 6 | Pure Adhesive/Sealant | 13.2 |
| Example 7 | Barium Zirconium Oxide (30 wt %) | 21.1 |
| Example 8 | Barium Zirconium Oxide (70 wt %) | 34.9 |
| Example 9 | Barium Zirconium Oxide (78 wt %) | 51 |

This example demonstrates that nanoparticles can be successfully incorporated in adhesive and sealant formulations and that the mechanical properties of adhesive/sealant formulation can be beneficially modified using the teachings herein. Additionally, it was found that the presence of barium in the formulation enables non-destructive examination of the sealant comprising the nanoparticle by techniques such as x-ray imaging.

Example 10-12

Adhesive Comprising Yttrium Oxide Nanoparticles

Varying amounts of yttrium oxide nanoparticles (average crystallite size less than 100 nanometers) were mixed with UV curable adhesive/sealant resin as in Example 4. The hardness of the adhesive/sealant nanocomposite was measured. For comparison, a sample was prepared without nanoparticles to assess the benefits of nanoparticles. The observed data are presented below in Table 2.

TABLE 2

| Sample | | Hardness, kgf/mm2 |
|---|---|---|
| Example 10 | Pure Adhesive/Sealant | 13.2 |
| Example 11 | Yttrium Oxide (66 wt %) | 37.8 |
| Example 12 | Yttrium Oxide (76 Wt %) | 49.9 |

These examples demonstrates that rare earth comprising nanoscale materials can be successfully incorporated in adhesive and sealant formulations and that the mechanical properties of adhesive/sealant formulation can be beneficially modified using the teachings herein.

Example 13-14

Adhesive Comprising Stabilized Zirconia Nanoparticles

3% yttria stabilized zirconium oxide nanoparticles (average crystallite size less than 25 nanometers) were mixed with UV curable adhesive/sealant resin as in Example 4. The mechanical properties of the adhesive/sealant nanocomposite were measured. For comparison, a sample was prepared without nanoparticles to assess the benefits of nanoparticles. The observed data are presented below in Table 3.

TABLE 3

| Sample | | Hardness, kgf/mm2 | Modulus E, CPa |
|---|---|---|---|
| Example 13 | Pure Adhesive/Sealant | 13.2 | 1.52 |
| Example 14 | Yttrium Zirconium Oxide (74 wt %) | 51.9 | 5.41 |

This example demonstrates that nanoparticles can be successfully prepared incorporated in adhesives and sealants. Amongst other features, the example also demonstrated that multiple mechanical properties of adhesive/sealant formulation can be beneficially modified using the teachings herein.

Example 15

Adhesive & Sealant Comprising Cerium Oxide Nanoparticles

Cerium oxide nanoparticles (average crystallite size less than 50 nanometers) were mixed with UV curable adhesive/sealant resin as in Example 4. When an effort was made to cure the resin with UV, it was noticed that the cure rate was extremely slow when compared to (a) pure resin with no nanoparticles and to (b) the nanocomposite in Example 4. This example demonstrates that nanoparticles can successfully modify the cure rate and reduce UV sensitivity of adhesives and sealants formulation.

Example 16-17

Adhesive Comprising Surface Functionalized Nanomaterials

Aluminum silicate nanoparticles (44% Al: 56% Si, surface area of about 30 $m^2$/gm, average particle size less than 100 nm) were treated with (3-Glycidoxy propyl) methyldiethoxysilane. This was accomplished by mixing 4 to 20 micromols of silane per square meter of nanoparticle at temperatures below 400 C, below 5 bar pressure and a pH below 7.0 (higher or lower concentrations of silane may be used in other applications). The treatment created nanoparticles with surface functionalized with epoxy groups. Next, as in Example 4, a nanocomposite from the surface functionalized nanoparticles was prepared. It was observed that two separate glass slides became strongly bonded by the adhesive forces of the nanocomposite. Without the surface treated nanoparticles, the glass slides did not adhere to each other, everything else remaining the same. This example demonstrates that nanoparticles can successfully modify the bonding characteristics of adhesives and sealants formulation.

In another experiment, aluminum silicate nanoparticles (44% Al: 56% Si, surface area of about 30 $m^2$/gm, average particle size less than 100 nm) were treated with Methacryloxypropyl trimethoxysilane. This was accomplished by mixing between 2 to 18 micromols of silane per square meter of nanoparticle at temperatures below 400 C, below 5 bar pressure and a pH below 7.0 (higher or lower concentrations of silane may be used in other applications). The treatment created nanoparticles with surface functionalized with acrylic functional groups. Next, as in example 4, a nanocomposite from the surface functionalized nanoparticles was prepared. It was observed that two separate glass slides once again became bonded by the adhesive forces of the nanocomposite. Without the surface treated nanoparticles, the glass slides did not adhere to each other, everything else remaining the same. Additionally, the optical clarity and strength of adherence of the bonded glass slides was higher with the surface functionalized nanoparticles than when a bond was formed with nanoparticles without surface treatment. This example demonstrates that surface functionalized nanoparticles can successfully modify the bonding characteristics of adhesives and sealants formulation.

While the present invention has been illustrated by a description of various embodiments, it is not the intention of the Applicants to restrict or in any way limit the scope of the appended claims to details herein. Various changes, omissions, advantages and modifications to the principles and embodiments described herein may be made by one skilled in the art from a consideration of the specification or practice of the invention disclosed herein.

The invention in its broader aspects is therefore not limited to the specific details and representative compositions as shown and described. It is intended that the specification and examples be considered as exemplary only, with the true scope and spirit of the invention being indicated by the following claims.

What is claimed is:
1. An adhesive formulation comprising:
an epoxy resin formulated to hold together two or more solid materials by surface attachment; and
nanoparticles having a mean domain size less than 100 nanometers, wherein the nanoparticles are selected from the group consisting of silicon dioxide nanoparticles, zirconium dioxide nanoparticles, titanium dioxide nanoparticles, rare earth oxide nanoparticles, calcium silicon oxide nanoparticles, zirconium silicon oxide nanoparticles, barium zirconium oxide nanoparticles, yttrium oxide nanoparticles, yttrium zirconium oxide nanoparticles, cerium oxide nanoparticles, a mixture of silicon dioxide nanoparticles and aluminum oxide nanoparticles, and combinations of any thereof;
wherein the nanoparticles impart negligible modification of visual appearance of the adhesive formulation.
2. The adhesive formulation of claim 1, wherein the nanoparticles comprise surface functionalizing epoxy groups.

3. The adhesive formulation of claim 1, wherein the nanoparticles comprise silicon dioxide nanoparticles.

4. The adhesive formulation of claim 1, wherein the nanoparticles comprise at least one of calcium silicon oxide nanoparticles, zirconium silicon oxide nanoparticles, barium zirconium oxide nanoparticles, yttrium oxide nanoparticles, yttrium zirconium oxide nanoparticles, or cerium oxide nanoparticles.

5. The adhesive formulation of claim 1, wherein the nanoparticles comprise 0.1% to 10% of the formulation by weight.

6. The formulation of claim 1, wherein the nanoparticles comprise a mixture of silicon dioxide nanoparticles and aluminum oxide nanoparticles.

7. A sealant formulation comprising:
 a resin comprising at least one of an acrylic resin or a urethane resin; and
 nanoparticles having a mean domain size less than 100 nanometers, wherein the nanoparticles are selected from the group consisting of silicon dioxide nanoparticles, zirconium dioxide nanoparticles, titanium dioxide nanoparticles, rare earth oxide nanoparticles, calcium silicon oxide nanoparticles, zirconium silicon oxide nanoparticles, barium zirconium oxide nanoparticles, yttrium oxide nanoparticles, yttrium zirconium oxide nanoparticles, cerium oxide nanoparticles, a mixture of silicon dioxide nanoparticles and aluminum oxide nanoparticles, and combinations of any thereof;
 wherein the nanoparticles impart negligible modification of visual appearance of the sealant formulation.

8. The sealant formulation of claim 7, wherein the resin comprises a urethane resin.

9. The sealant formulation of claim 7, wherein the resin comprises an acrylic resin.

10. The sealant formulation of claim 9, wherein the nanoparticles comprise surface functionalizing acrylic groups.

11. The sealant formulation of claim 7, wherein the nanoparticles comprise silicon dioxide nanoparticles.

12. The sealant formulation of claim 7, wherein the nanoparticles comprise at least one of calcium silicon oxide nanoparticles, zirconium silicon oxide nanoparticles, calcium aluminum oxide nanoparticles, barium zirconium oxide nanoparticles, yttrium oxide nanoparticles, yttrium zirconium oxide nanoparticles, or cerium oxide nanoparticles.

13. The sealant formulation of claim 7, wherein the nanoparticles comprise 0.1% to 10% of the formulation by weight.

14. The formulation of claim 7, wherein the nanoparticles comprise a mixture of silicon dioxide nanoparticles and aluminum oxide nanoparticles.

15. An adhesive or sealant formulation comprising:
 an elastomer resin; and
 nanoparticles having a mean domain size less than 100 nanometers, wherein the nanoparticles are selected from the group consisting of silicon dioxide nanoparticles, zirconium dioxide nanoparticles, titanium dioxide nanoparticles, rare earth oxide nanoparticles, calcium silicon oxide nanoparticles, zirconium silicon oxide nanoparticles, barium zirconium oxide nanoparticles, yttrium oxide nanoparticles, yttrium zirconium oxide nanoparticles, cerium oxide nanoparticles, a mixture of silicon dioxide nanoparticles and aluminum oxide nanoparticles, and combinations of any thereof;
 wherein the nanoparticles impart negligible modification of visual appearance of the adhesive or sealant formulation.

16. The formulation of claim 15, wherein the elastomer resin comprises a rubber.

17. The formulation of claim 15, wherein the nanoparticles comprise silicon dioxide nanoparticles.

18. The formulation of claim 15, wherein the nanoparticles comprise at least one of calcium silicon oxide nanoparticles, zirconium silicon oxide nanoparticles, calcium aluminum oxide nanoparticles, barium zirconium oxide nanoparticles, yttrium oxide nanoparticles, yttrium zirconium oxide nanoparticles, or cerium oxide nanoparticles.

19. The formulation of claim 15, wherein the nanoparticles comprise 0.1% to 10% of the formulation by weight.

20. The formulation of claim 15, wherein the nanoparticles comprise a mixture of silicon dioxide nanoparticles and aluminum oxide nanoparticles.

\* \* \* \* \*